June 30, 1964   W. B. SEIDEL ETAL   3,139,083
MACHINE TOOL CONTOURING MECHANISM
Filed Feb. 19, 1960   16 Sheets-Sheet 3

INVENTORS
WILLIAM B. SEIDEL
JOHN M. MORGAN JR.
ERNEST GOSNEY JR.
BY
ATTORNEYS

June 30, 1964 W. B. SEIDEL ETAL 3,139,083
MACHINE TOOL CONTOURING MECHANISM
Filed Feb. 19, 1960 16 Sheets-Sheet 4

INVENTORS
WILLIAM B. SEIDEL
JOHN M. MORGAN JR.
ERNEST GOSNEY JR.
BY Howard T. Keiser
& John F. Verhoeven
ATTORNEYS

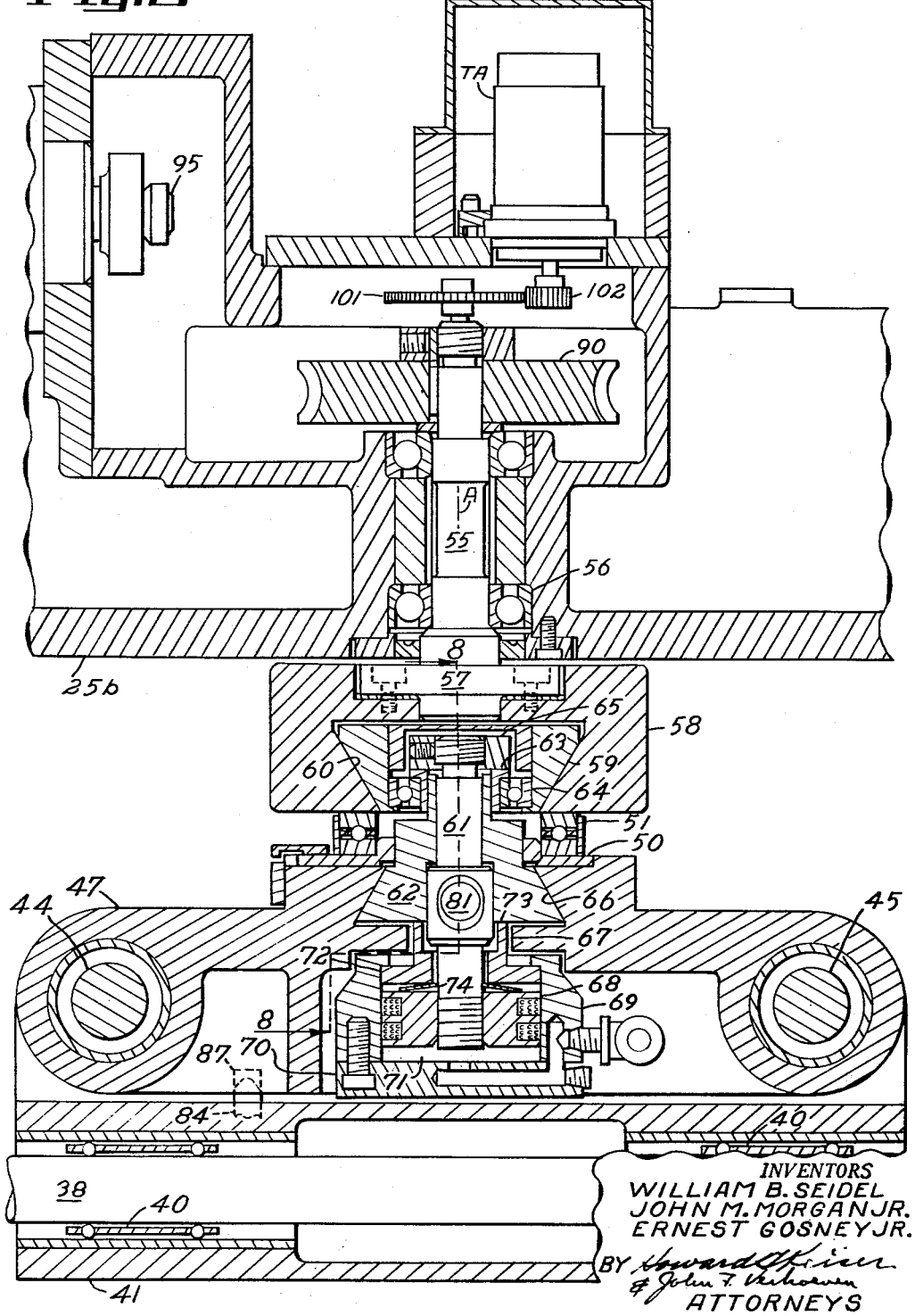

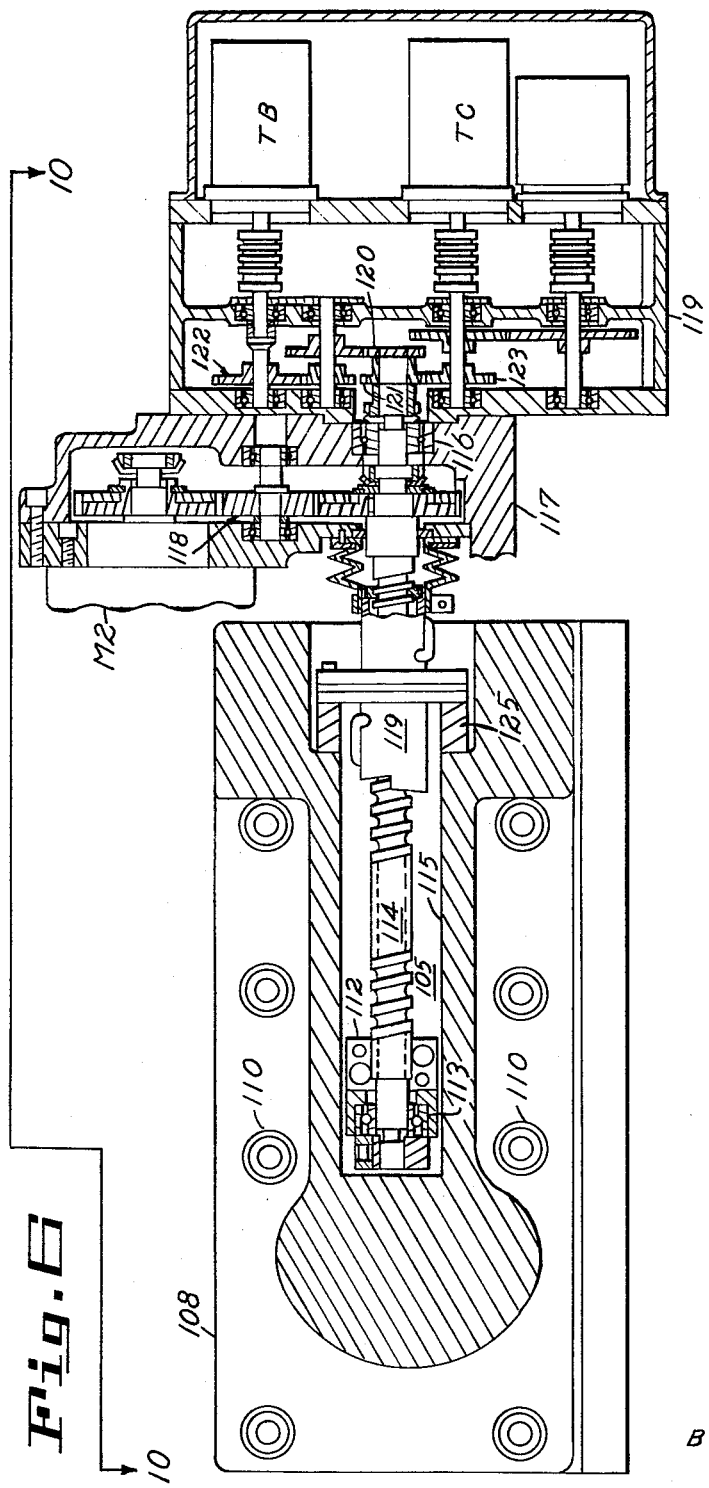

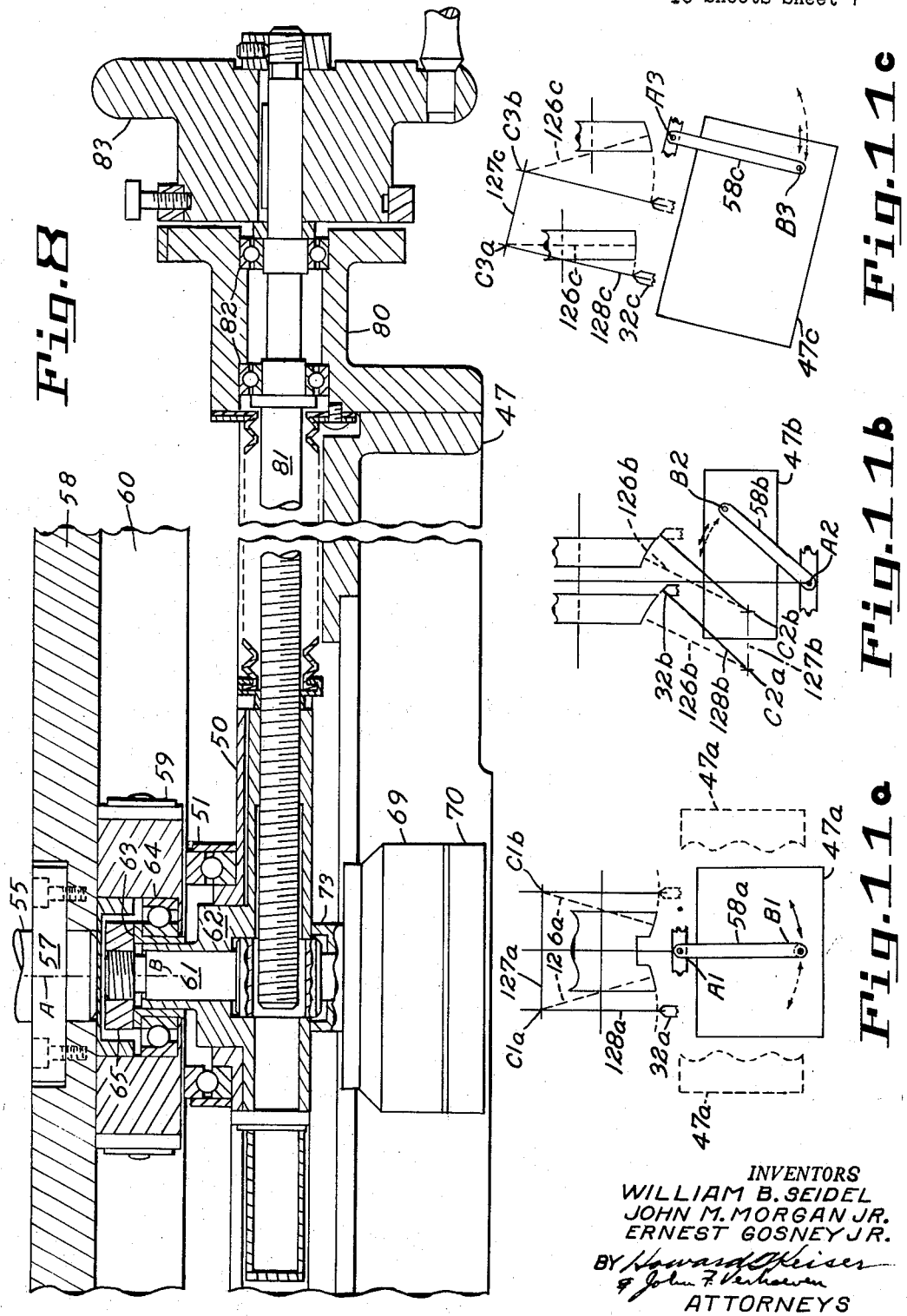

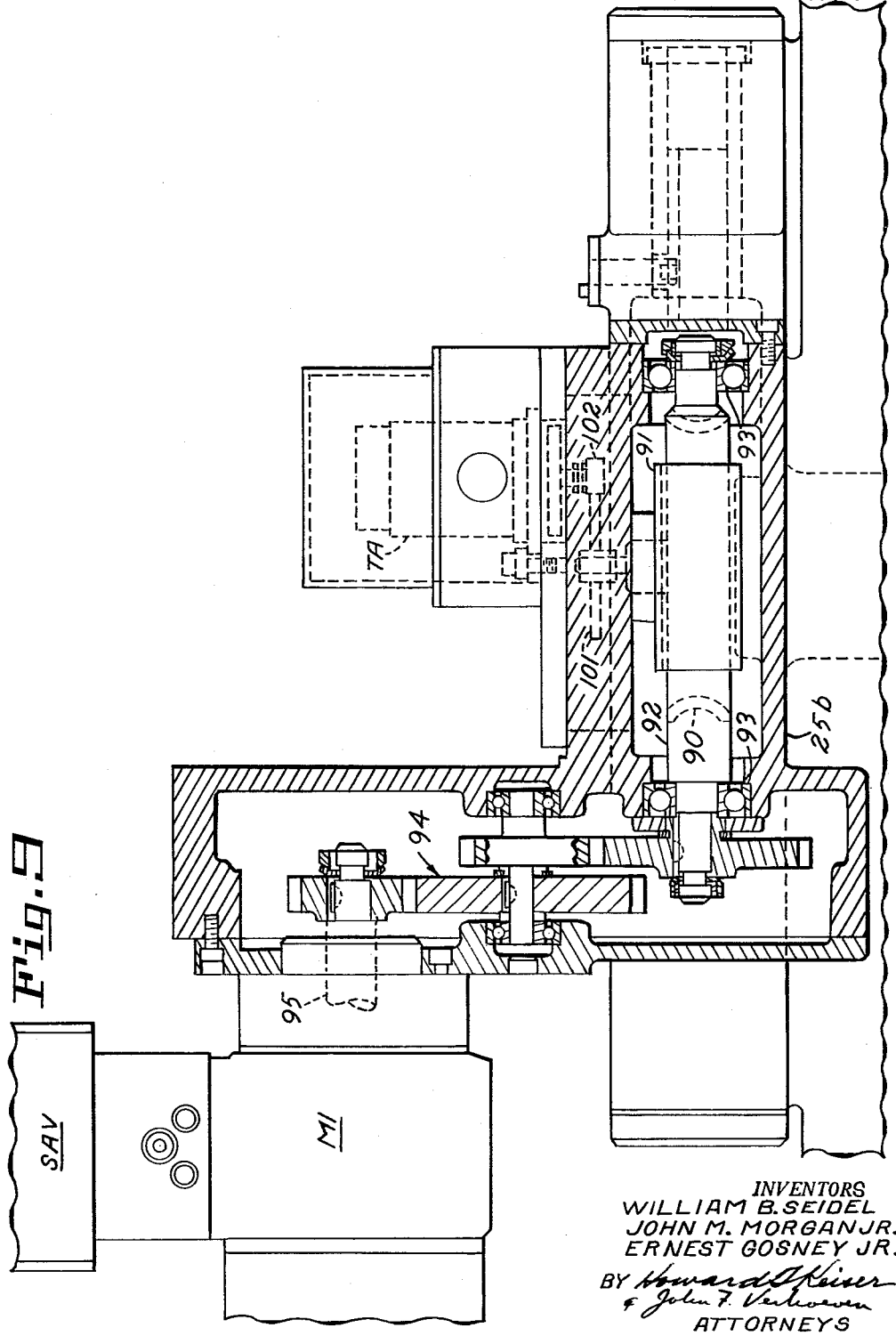

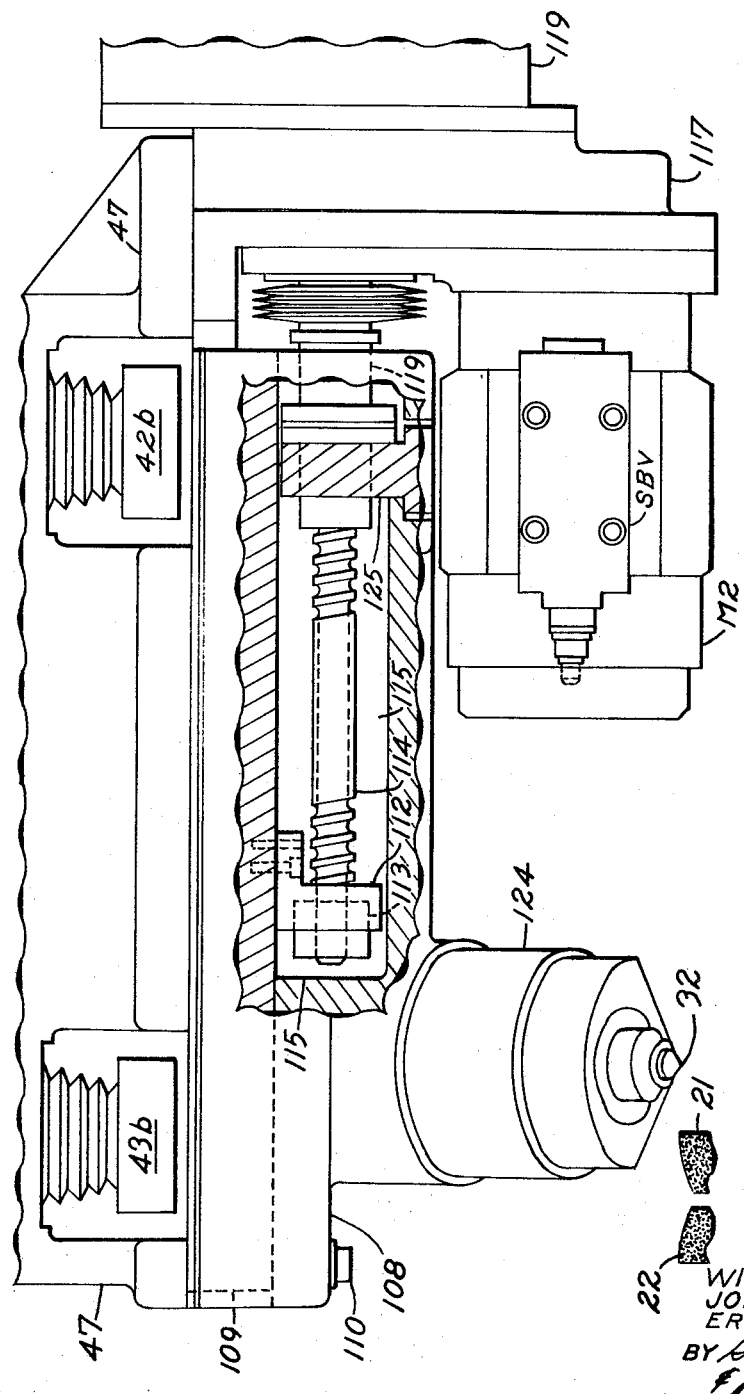

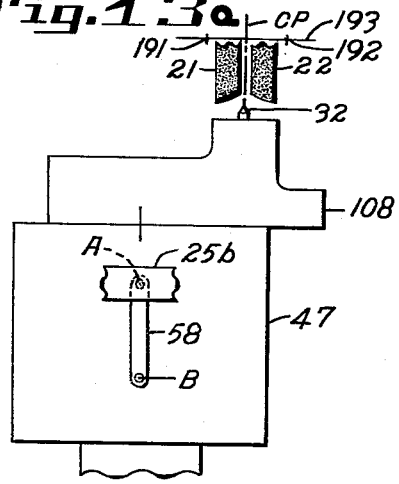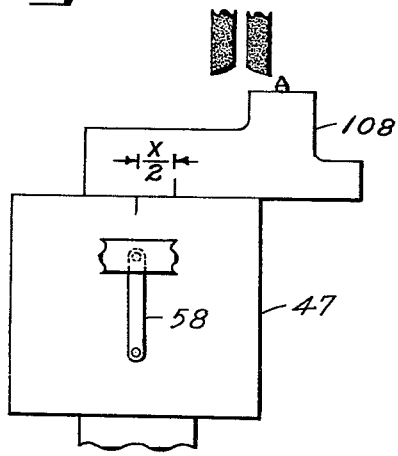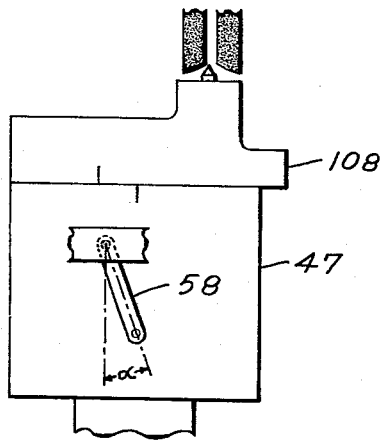

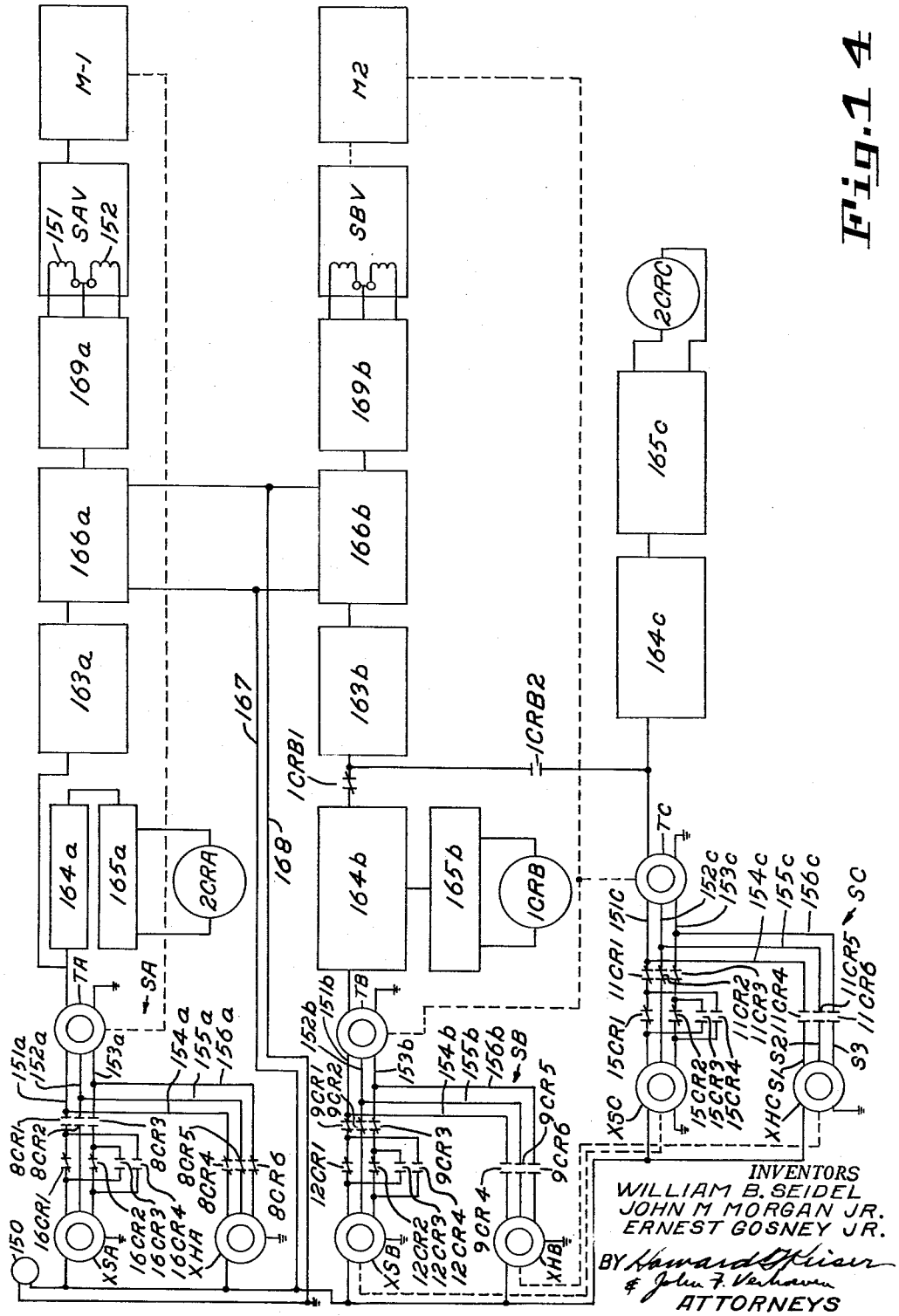

INVENTORS
WILLIAM B. SEIDEL
JOHN M. MORGAN JR.
ERNEST GOSNEY JR.
BY
ATTORNEYS

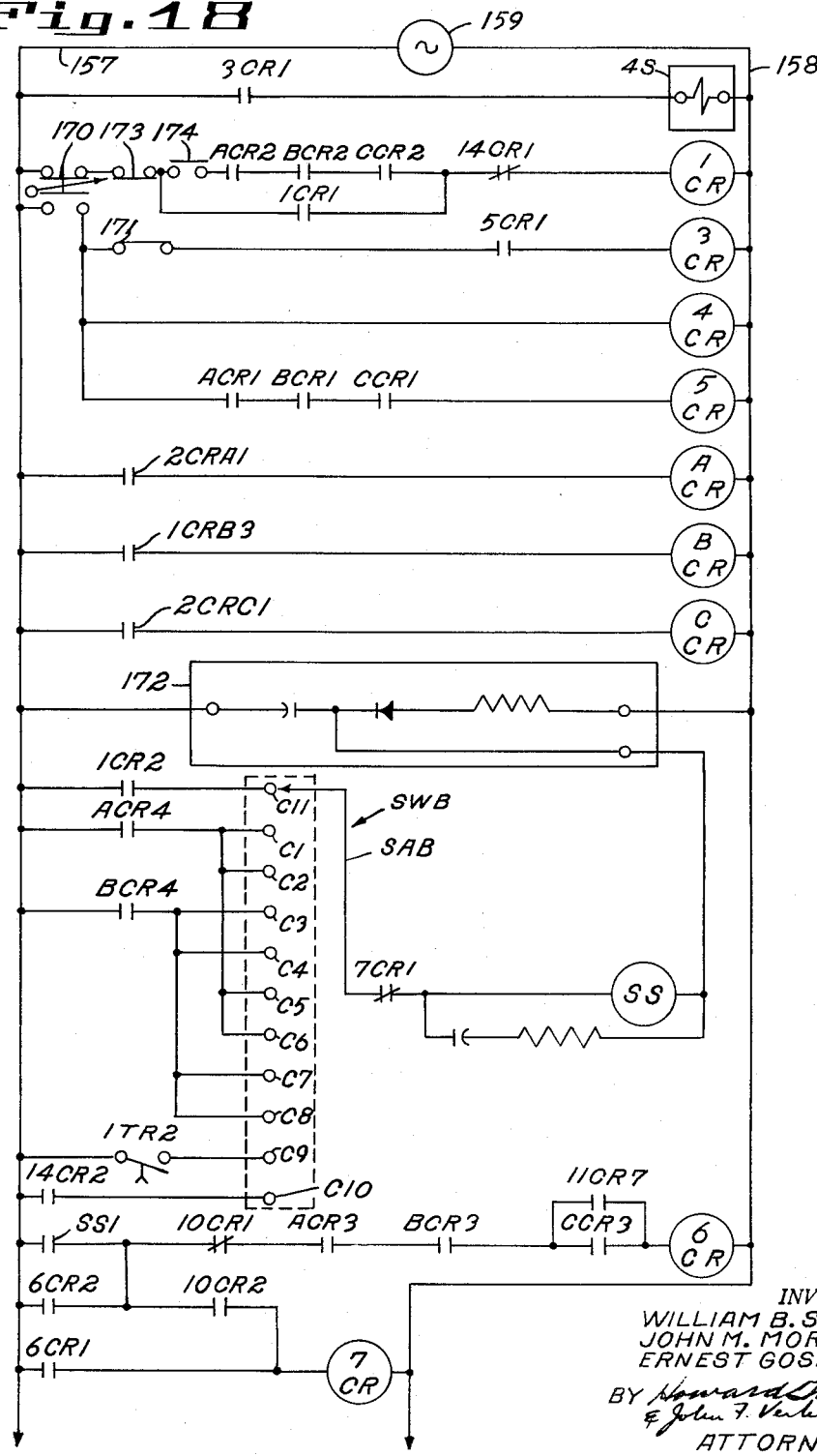

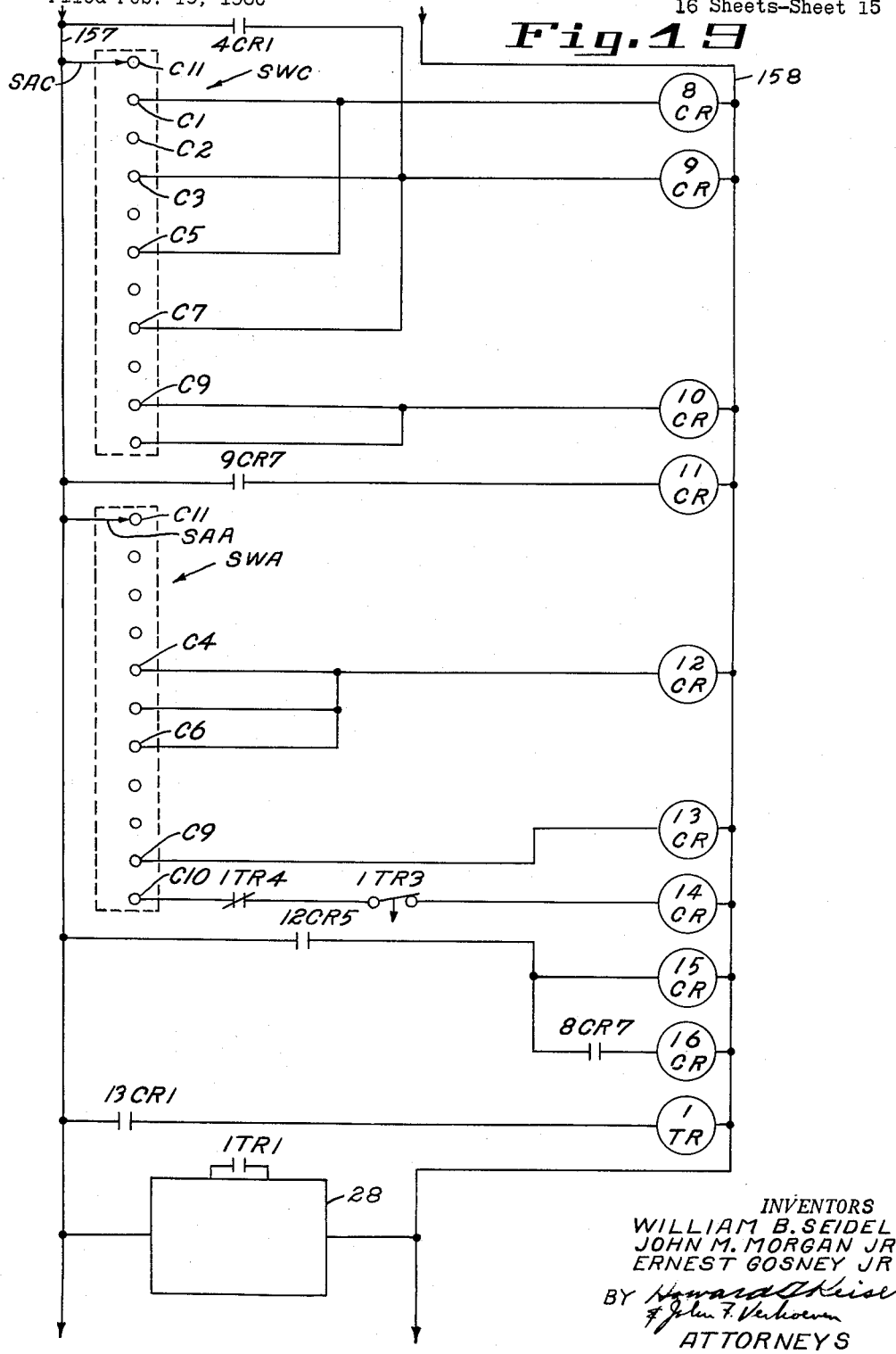

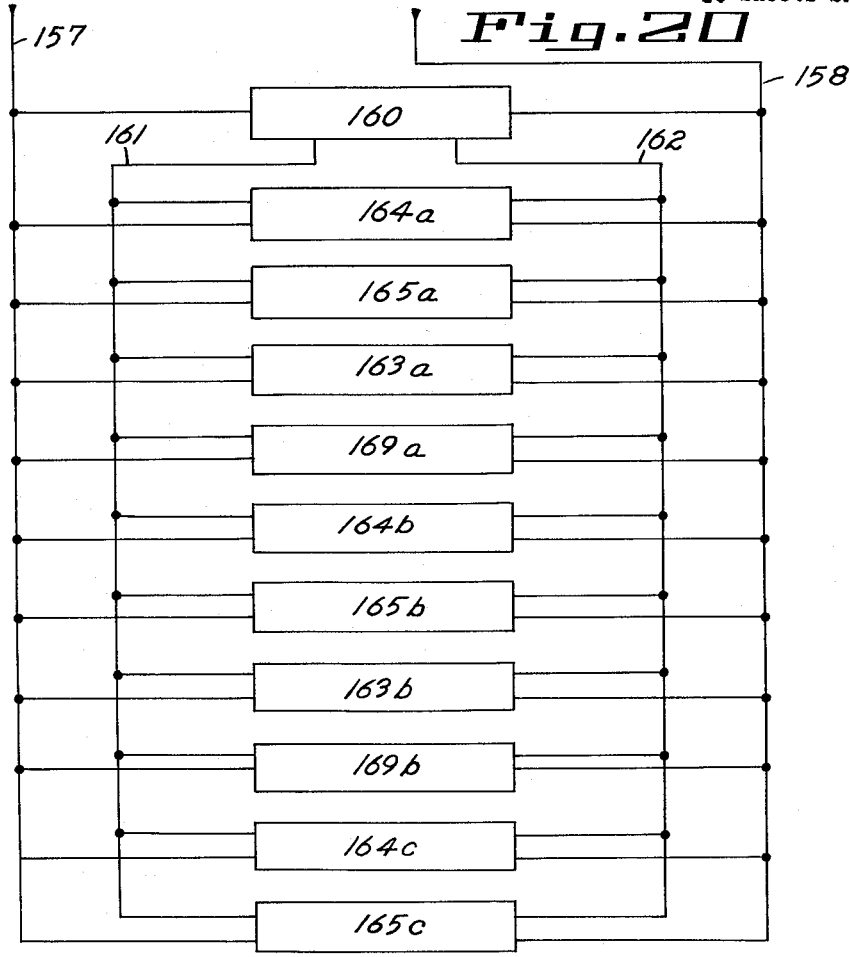

United States Patent Office 3,139,083
Patented June 30, 1964

3,139,083
MACHINE TOOL CONTOURING MECHANISM
William Bernard Seidel and John M. Morgan, Jr., Cincinnati, Ohio, and Ernest Gosney, Jr., Mentor, Ky., assignors to The Cincinnati Milling Machine Co., Cincinnati, Ohio, a corporation of Ohio
Filed Feb. 19, 1960, Ser. No. 9,731
18 Claims. (Cl. 125—11)

The present invention relates to a machine tool mechanism for controlled movement of a machine tool member such as a tool for contouring, particularly suitable for truing a peripheral arcuate contour on the wheel, or wheels, of a grinding machine.

In the present invention a mechanism is provided for controlled movement of a machine member by which, in the illustrated embodiment of the invention, a forming tool is swung in translation about a fixed axis for movement in an arc of predetermined radius. With the specific embodiment described herein a pair of circular arcs on the same or different grinding wheels can be quickly and accurately formed. In this embodiment an upper slide is mounted for movement in one direction on a lower slide which, in turn, is movable transversely to said direction on a support member whereby the upper slide is universally movable in translation. A radius arm pivotally connected to the support member to swing about an axis is pivotally connected to the upper slide at a selected distance from said axis. A tool slide, from which a forming tool such as a diamond extends, is mounted on the upper slide for movement parallel to a line between the centers of the arcs to be formed. Since the upper slide, and hence the tool, are swung in translation, the tool, regardless of the position of the tool slide on the upper slide, describes a circular arc of radius equal to the length of the radius arm, and thus, by selectively positioning the tool slide on the upper slide successively in two or more positions a contour defining, in cross section, two or more arcs having spaced centers can be formed on the periphery of a wheel, or wheels.

With this construction highly accurate arcs can be formed with minimum precision in the movement of the mechanism. For example, to true the first arc the tool slide may be initially shifted to a precise position on the upper slide where the diamond point and the center of one of the arcs are in a line parallel to the radius arm, which may be in any convenient predetermined angular position. The arm can then be swung from said predetermined position to move the tool across the wheel. To true the second wheel the tool slide may be shifted on the upper slide a distance corresponding accurately to the distance between the centers of the arcs, and the arm again swung from said predetermined position to move the diamond across the second wheel. Thus, assuming that the support member is properly positioned relative to the wheels, and that the radius arm is accurately adjusted to correspond to the desired radius and initially located accurately in its predetermined position, highly accurate arcs can be formed even though the only precision movement required during the cycle is the movement of the tool slide on the upper slide.

With this construction a wide variety of circular arcs of selected radius, the centers of which need not lie in any particular relation to the wheel, or wheels, can be formed with precision. Cams, which are difficult to form, subject to wear, and usable only for a single predetermined form, are not required. Since the tool is swung in translation, the radius arm may be located in any convenient position relative to the part, such as grinding wheels, to be formed. Because the arc or arcs formed are determined only by the positioning of the tool slide on the upper slide and the adjustment of the radius arm, the mechanism can be adjusted quickly to change from one job to another.

Novel means are provided to move the mechanism automatically through a cycle. Each of the members which move the tool, that is, the tool slide and the arm in the illustrated embodiment, have operatively connected thereto a synchro control transformer, the rotor of the slide transformer rotating in accordance with movement of the slide and the rotor of the radius arm transformer rotating in accordance with swinging of the arm. For each control transformer there is provided a pair of synchro transmitters, the rotors thereof being set at spaced apart angles corresponding to two spaced positions in the cycle of the machine tool member. The transmitters are selectively connected, one at a time, to their control transformers to produce a voltage of predetermined polarity when the member to which the transformer is connected is spaced from the position for which the transmitter is set. Power means are operable in response to this voltage to move the machine member toward the position corresponding to the transmitter position. When the position defined by the connected transmitter is reached the voltage output of the transformer nulls and movement stops. To return the tool the other transmitter of the pair is connected to the transformer, producing a voltage output therein of opposite polarity which operates to return the machine member to the position for which said other transmitter is set.

In the specific embodiment of the invention described herein one transmitter of each pair is set at a predetermined home position. If arcs symmetrical about a center plane are to be formed the home position of the arm may be parallel to the center plane and the home position of the tool carrying slide on the upper slide may be the position where the forming tool, such as the diamond of a truing mechanism, lies in the center plane. The other transmitter of each pair is set at a predetermined selected position spaced from the home position corresponding to the position to which it is desired to move the tool member. For example, the selected position transmitter for the slide is set to correspond to a position of the slide where the diamond is on a line parallel to the predetermined home position of the arm, which line passes through the center of one of the arcs. If the arcs are symmetrical about a center plane, and the home position of the slide and arm are as described above, the selected position of the slide will be spaced from its home position a distance equal to one half the distance between the centers of the arcs. The selected position of the arm will be angularly spaced from the home position thereof an angular amount at least as great as the arc to be swung. The stator lines of the selected position transmitters are alternately connectable to their corresponding transformers in either a predetermined sequence, or a reverse sequence where two of the lines are reversed, so that each of these transmitters, with one predetermined setting, electrically define two positions, one on one side of the home position when the transmitter is connected to the transformer with the stator lines in predetermined sequence, and the other on the other side of the home position a like amount when the transmitter is connected to the transformer with the stator lines in reverse sequence.

The rotors of the control transformers are geared to the respective tool members to rotate through less than 180 degrees as said members move between their home positions and their selected positions so that by selectively connecting the respective transmitters of each pair to their corresponding transformers, both the slide and the arm can be moved under the control of the synchro units in either direction from the home positions as desired. Means are provided automatically to connect the transmitters to their respective transformers in a sequence to move the mechanism through a cycle, such as a truing cycle, in which two spaced peripheral arcs are formed.

It is therefore an object of the present invention to provide an improved mechanism to form contours defining in cross section circular arcs.

It is another object of the present invention to provide an improved truing mechanism for truing contours defining in cross-section a pair of spaced circular arcs.

It is yet another object of the present invention to provide improved mechanism for moving a machine member between two predetermined positions.

It is still another object of the present invention to provide an improved mechanism for automatically performing a truing operation.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 5 is a view taken on the line 5—5 of FIG. 1;

FIG. 6 is a view taken on the line 6—6 of FIG. 4 with the motor shown out of position for clarity;

FIG. 8 is a view taken on the line 8—8 of FIG. 5;

FIG. 9 is a view taken on the line 9—9 of FIG. 3;

FIG. 10 is a view taken on the line 10—10 of FIG. 6;

Figure 12:
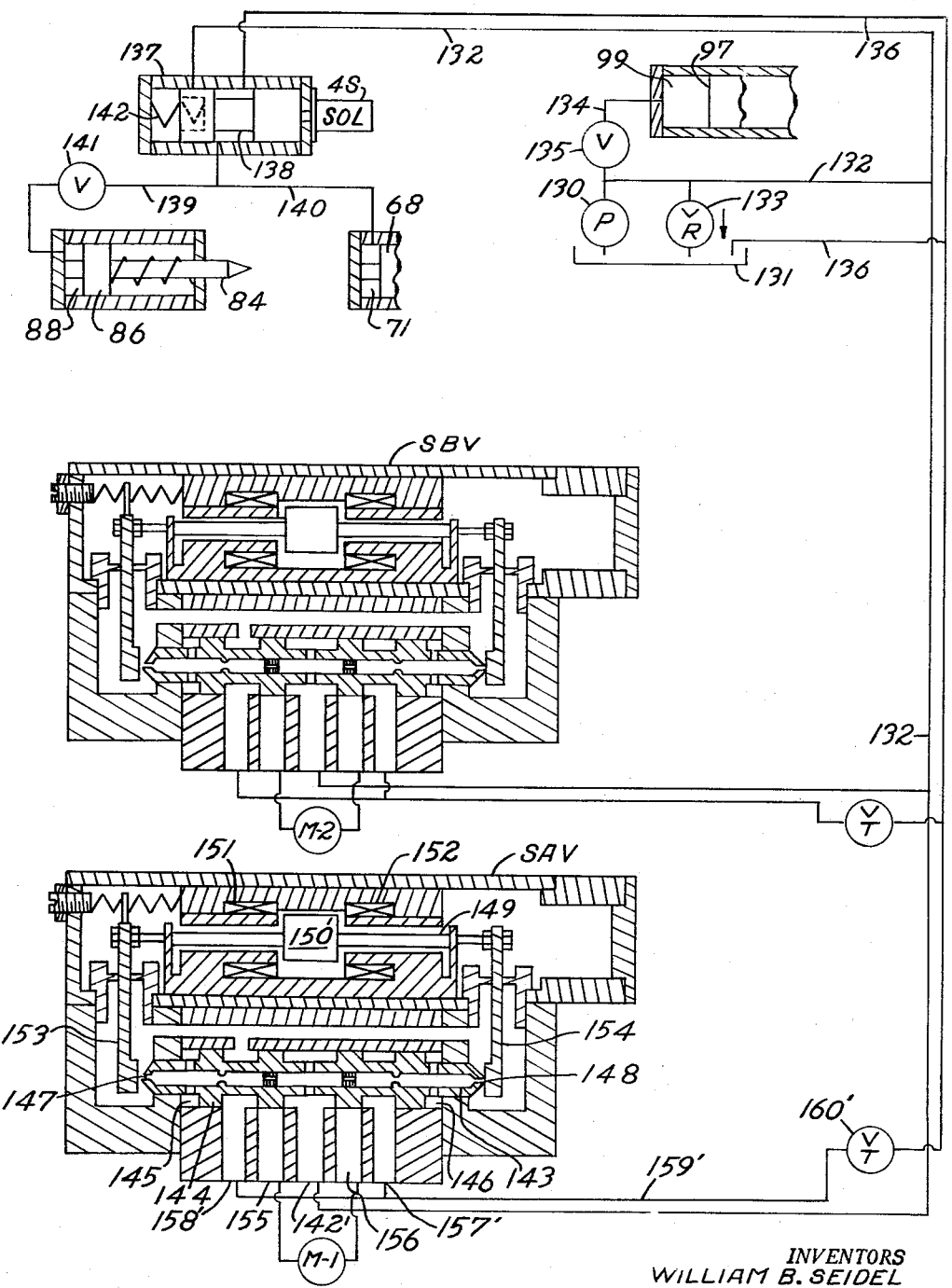
Figure 15:
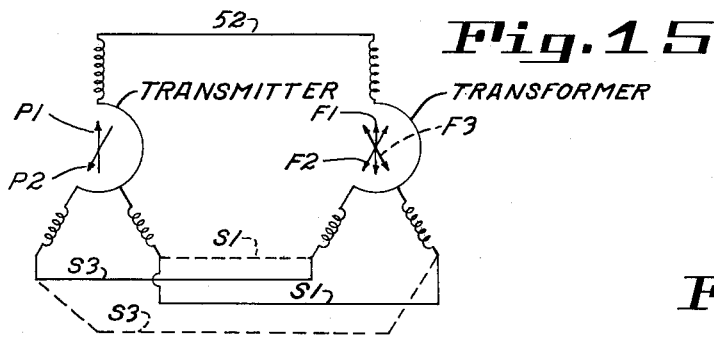
Figure 16:
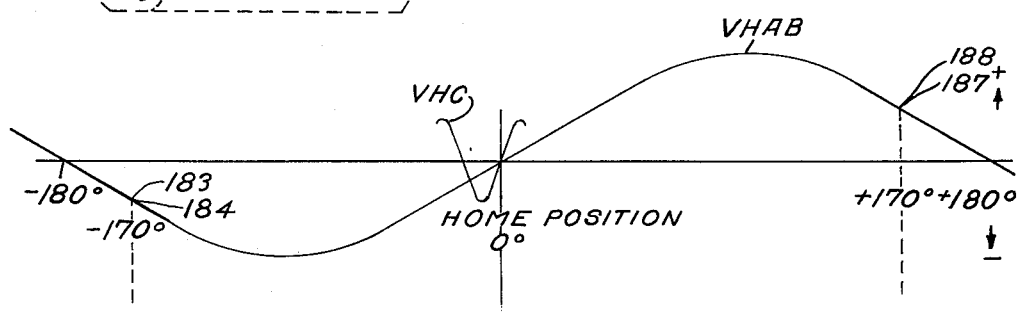
Figure 17:
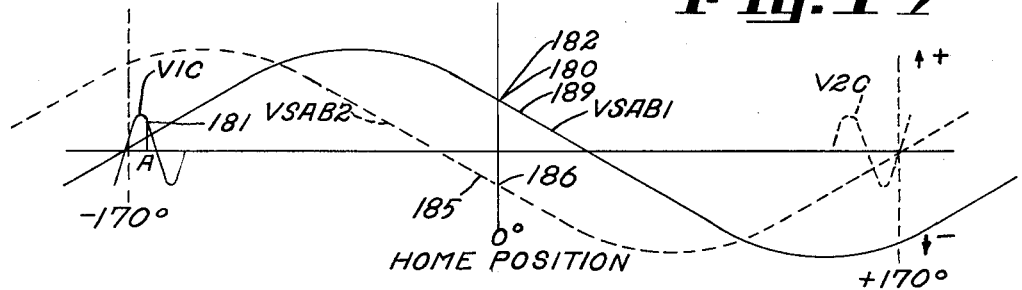

FIGS. 11a, 11b, and 11c are schematic representations of different embodiments of the present invention;

FIG. 12 is a hydraulic diagram of the mechanism of the present invention;

FIGS. 13a, 13b, 13c, 13d, and 13e are schematic representations of the positions of the tool slide and radius arm during different portions of a typical truing cycle;

FIG. 14 is a diagram showing the synchro sets and the units through which the radius arm motor and slide motor are controlled by the voltage outputs of said synchro sets;

FIG. 15 is a schematic representation of a synchro transmitter and transformer to illustrate the various settings of the several different transmitters used in the embodiment of the invention described, and showing the manner in which the various selected position transmitters are alternately connected in a predetermined sequence and a reverse sequence to their respective transformers;

FIG. 16 is a diagram showing the voltages produced in the various synchro sets when the transformer of the set is connected to the home position transmitter of said set;

FIG. 17 is a diagram showing the voltages produced in the various synchro sets when the transformer of the set is connected to the selected position transmitter of said set, the curves in solid lines showing the voltages when the transformer is connected to the transmitter in one sequence and the curves in dotted lines showing the voltage when the transformer is connected to the transmitter in reverse sequence; and FIGS. 18, 19, and 20 are electrical diagrams for the described embodiment of the invention.

Figure 1:
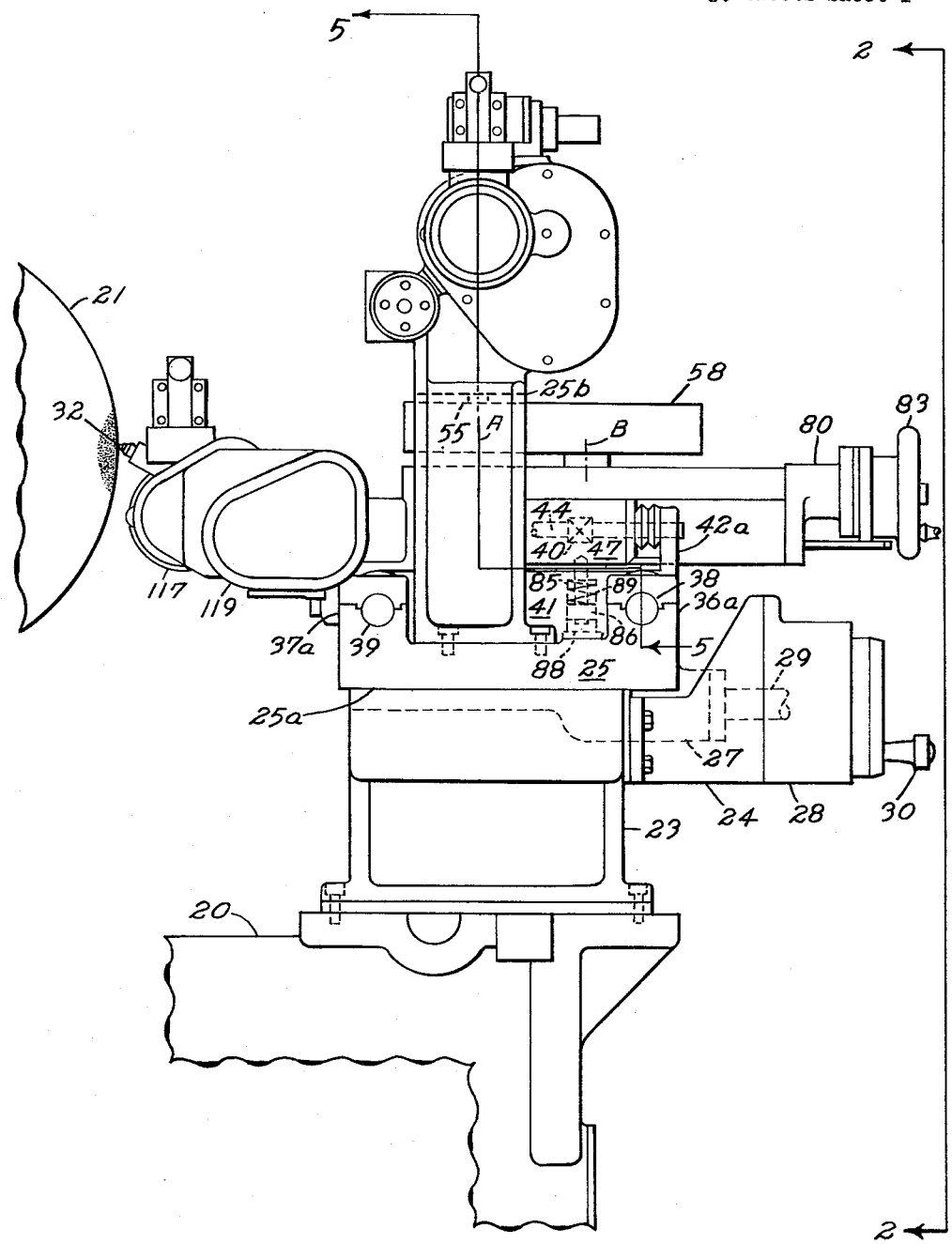
FIG. 1 is a fragmentary view in elevation of the mechanism of the present invention.
Figure 2:
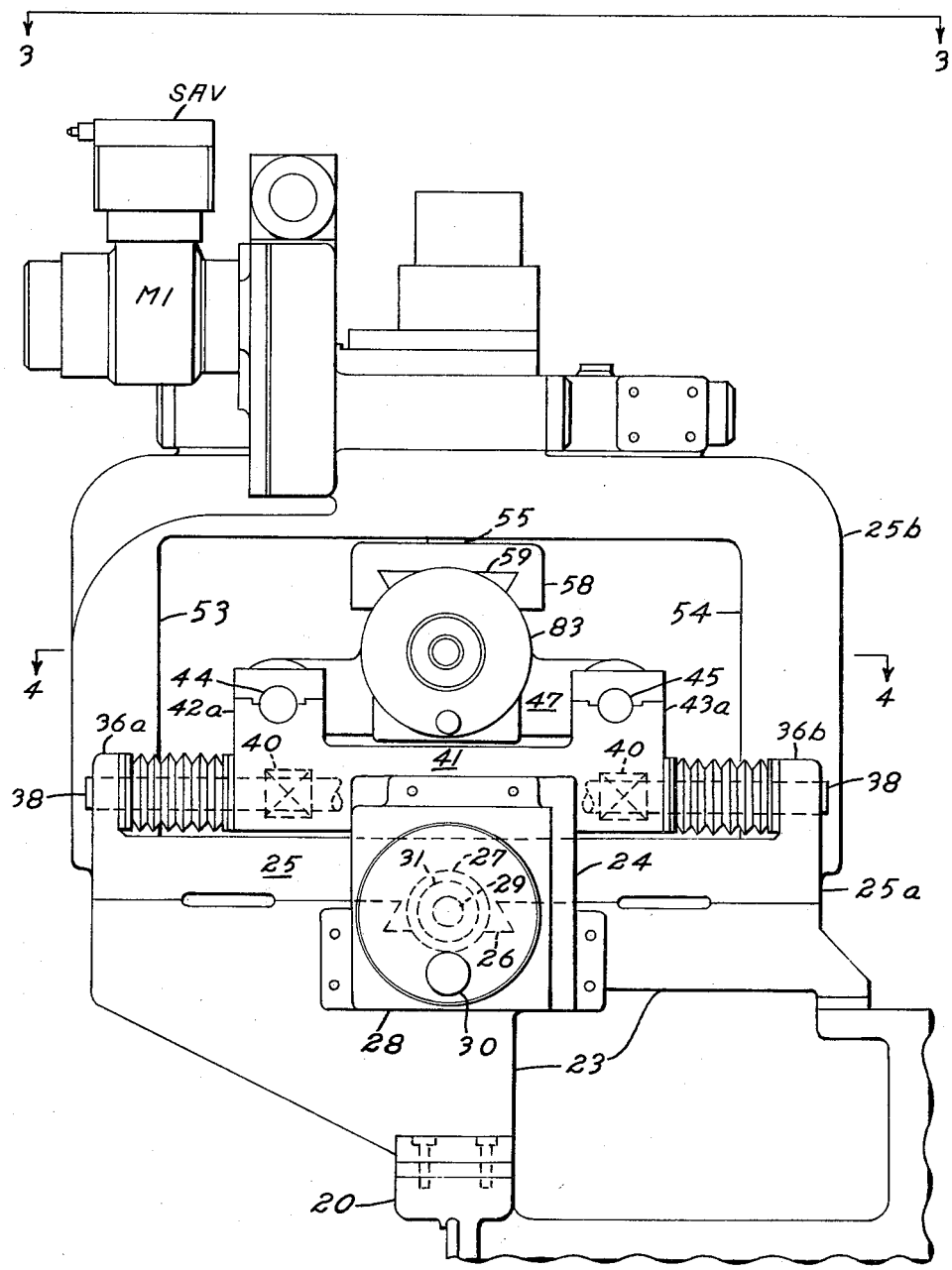
FIG. 2 is a view taken on the line 2—2 of FIG. 1.
Figure 4:
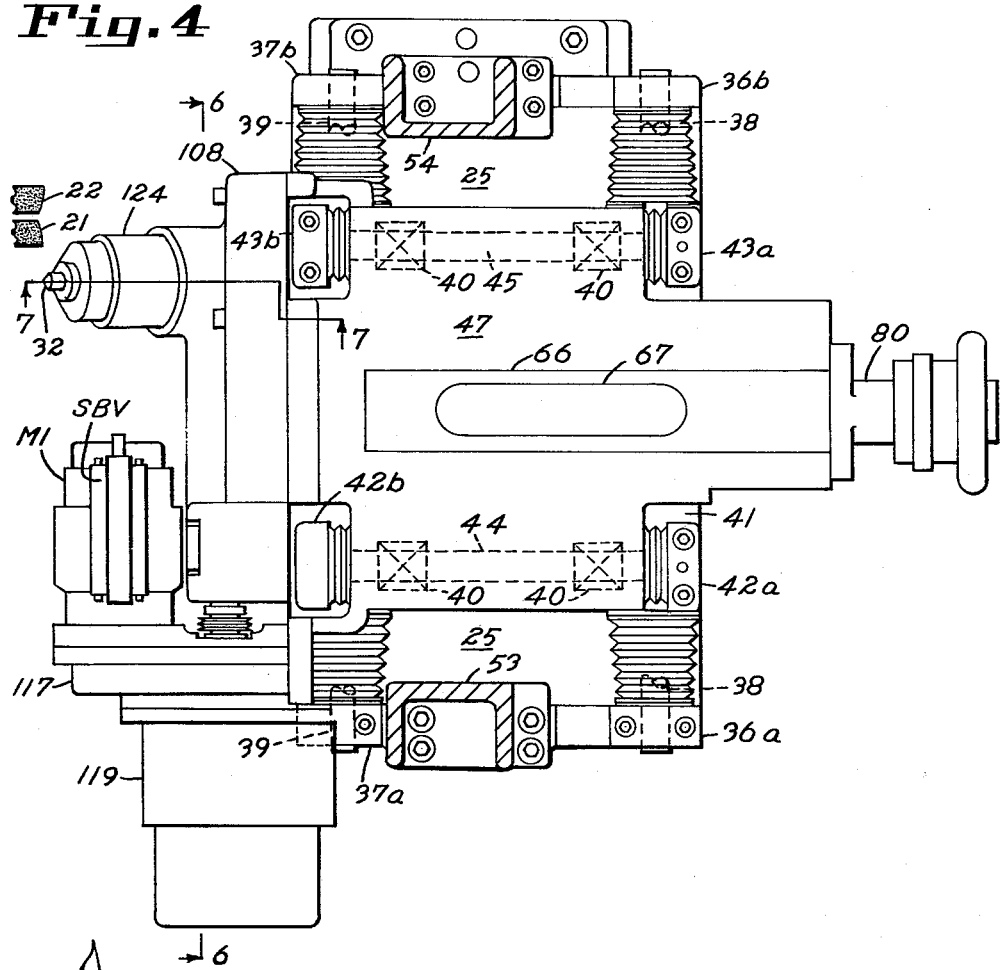
FIG. 4 is a view taken on the line 4—4 of FIG. 2.

A truing mechanism constructed in accordance with the present invention is shown in FIG. 1 mounted on a portion 20 of the bed of a grinding machine behind the pair of grinding wheels 21 and 22 which are mounted on another portion (not shown) of the bed for forward advancement (to the left as viewed in FIG. 1) into the work and retraction to the position shown in FIG. 1. In the specific embodiment shown, the wheels are closely spaced and the truing diamond 32 engages the wheels on a horizontal plane through the common axis of the wheels. The peripheries of the wheels in that plane define circular arcs, the centers 191 and 192 of the arcs (FIG. 13a) being spaced outboard of the wheels and lying on a line 193 parallel to the axis of the wheels. As shown in FIGS. 1 and 2, a base member 23 is secured to the bed portion 20 and has a rearwardly extending bracket 24 connected thereto. A support member 25 is slidably mounted on the upper surface of the base member 23 and includes a lower portion 25a and an upstanding bridge portion 25b. The lower portion 25a of the support member has a dovetailed portion 26 received in the base member 23 and a boss 27 extending rearwardly therefrom. A conventional automatic truing compensation mechanism 28 is secured to the rear face of bracket 24 and one end of shaft 29 is journaled therein and connected to handwheel 30. The opposite end of shaft 29 is threaded and engages a nut 31 secured in the support member 25. The dovetailed portion 26 and shaft 29 extend perpendicularly to the line of centers 193 of the arcs of the wheels and the support member 25 (and with it the diamond 32) can be manually shifted relative to the grinding wheels with handwheel 30. The automatic compensation mechanism 28 (FIG. 1) is operatively connected to the shaft 29 in a conventional manner (not shown) to rotate the same a predetermined amount after each truing cycle and advance the diamond 32, the work (not shown) being shifted toward the wheels a like amount. The support member 25 has two pair 36a—36b and 37a—37b of upstanding ears (FIGS. 1, 2, and 4) each ear supporting one of the shafts 38, 39 which extend parallel to the axis of the wheels. These shafts are received in linear ball bearings 40 mounted in a lower slide 41 (FIG. 2) and support the lower slide for free lateral movement relative to the support member 25 above the upper surface of the lower portion of said member 25. The lower slide 41 also has two pair of upstanding ears 42a—42b and 43a—43b (FIGS. 2 and 4) which support, respectively, shafts 44 and 45 perpendicular to shafts 38 and 39 and parallel to the planes of the grinding wheels. These shafts are also received in linear ball bearings 40 mounted in an upper slide 47 and support that slide above the upper surface of the lower slide for free movement relative to the lower slide and support member and parallel to the planes of the wheel. Thus the upper slide 47 is universally movable relative to the support member 25 in a plane in translation.

The bridge portion 25b of the support member extends over the lower and upper slides and has legs 53 and 54 straddling these slides, the legs being secured to the lower portion of the support. The upper slide 47 is caused to move in a circular arc, thereby moving the diamond point carried thereby in a circular arc, by means of a radius arm pivotally connected to the bridge portion of the support member at one end on an axis A and pivotally connected a selected distance from said axis to the upper slide on an axis B. During the truing cycle the support member 25, and bridge portion 25b thereof, remain fixed. As shown best in FIG. 5, a shaft 55, having a longitudinal axis which defines the axis A, is received in bearings 56 mounted in the bridge portion 25b and has an integral circular flange 57 secured in the upper surface of an arm 58 whereby on rotation of shaft 55 the arm 58 swings in an arc about axis A. As shown in FIGS. 5 and 8, a dovetailed slide 59 is received in ways 60 in the lower surface of the arm 58 for longitudinal movement along the arm. A pivot pin 61, having a longitudinal axis which defines the axis B, snugly receives thereon a nut 62 which is received in a sleeve 63 mounted in bearing 64 in the slide member 59. The pin 61 is held in arm 58 by collar 65 received on the pin over the flanged upper end of sleeve 63 which, in turn, is supported by the bearing 64. The nut 62 is also received in an opening in a flat member 50 which is mounted for longitudinal sliding on the upper surface of the upper slide 47. The lower portion of the nut 62 has dovetailed sides and is slidably received in ways 66 in the upper surface of upper slide 47. The pin 61 extends through nut 62 and through a slot 67 between the ways 66 on the upper slide and has a piston 68 secured on its lower end. Piston 68 is received in a cylinder 69 which is located inside the upper slide 47 but is not connected thereto. The lower end of the cylinder has a plate 70 connected thereto to define a chamber 71 on one side of the piston and the upper end of the cylinder has a sleeve 72 therein terminating at its upper end in an annular portion 73 engaging the underside of nut 62. Between the lower end of sleeve 72 and piston 68 is an annular spring member 74 which urges the piston 68, and hence the slide member 59, downwardly and urges the sleeve 72, and hence the dovetailed nut 62, upwardly. Thus, normally, the slide 59 and nut 62 are drawn together against their respective ways in the arm 58 and upper slide 47, respectively, to secure the pin 61 in a predetermined position relative to both the arm 58 and the upper slide 47. A thrust bearing 51 between the flat slidable member 50 on the upper slide 47 and the arm 58 permits relative rotation between the arm 58 and upper slide 47 even when the pin 61 is clamped in a fixed position. When pressure is introduced to chamber 71 the force exerted by spring member 74 is released and the assembly comprising the slide 59, pin 61, the flat sliding member 50, the bearing 51, the nut 62, and the clamping cylinder 69 can be shifted to a selected position spaced from the axis A of shaft 55. In FIG. 8, the pin 61 is shown aligned with the pivot axis A of the arm and, in this position, the radius arm connecting the upper slide 47 to the portion 25b of the support member is of zero length, since the radius arm is equal in length to the distance between the fixed axis A and the radially shiftable axis B, and the upper slide will not be swung in an arc even if the arm 58 is rotated. When the pin 61 is shifted a predetermined distance from axis A a radius arm will be established which will cause every portion of the upper slide, and any member such as the diamond point carried thereby, to swing in an arc with a radius equal to the length of the radius arm as defined by the span between axes A and B, when the arm 58 is swung. The radius of the arc swung by the diamond point will be the same regardless of where pin 61 is connected to upper slide 47 and that pin could be mounted in a fixed position in slide 47. However, such a construction would require that the shafts 38, 39 and 44, 45 which define cross ways for the upper slide 47, be comparatively long to accommodate the movement of the slide 47 if the slide were shifted relative to the fixed axis A by adjustment of the radius arm. Therefore, in the disclosed embodiment, the pin 61 is shifted, not only relative to arm 58, but also relative to upper slide 47 so that, when the arm 58 is swung to a predetermined home position, the span between axes A and B defining the radius arm can be adjusted without shifting upper slide 47 relative to fixed axis A.

As shown best in FIG. 8, the upper slide 47 has a hub 80 connected to its rear face in which a shaft 81 is mounted in bearings 82, the shaft 81 extending parallel to arm 58 when that member is in its predetermined home position parallel to the planes of the grinding wheels. The shaft 81 has a handwheel 83 mounted on one end and is threaded at the opposite end for engagement with nut 62. Since shaft 55, to which the arm 58 is connected, is mounted in bridge portion 25b and rotates about the fixed axis A, if the slide 47 is held fixed and pressure is introduced to chamber 71 to release the clamping force of spring 74, and the arm 58 is aligned with shaft 81, the assembly comprising the slide member 59, pin 61, nut 62, bearing 51, sliding member 50 and clamping cylinder 69 can be moved a selected distance from the axis A of shaft 55 by rotation of shaft 81. Upper slide 47, although normally movable in translation, may be held in a fixed position for adjustment of the radius arm by actuation of a clamp plunger 84. As shown in FIGS. 1 and 5, plunger 84 is mounted in a cylindrical bore 85 in lower slide 41 and has a piston 86 which urges the plunger upwardly into an opening 87 in the upper slide 47 when pressure is introduced to chamber 88 below the piston, the opening 87 being aligned with bore 85 when the arm 58 is in its home position. Spring 89 normally retracts the plunger 84 from the upper slide. Thus when the upper and lower slides are moved so that plunger 84 is aligned with opening 87, and plunger 84 is actuated, both slides will be held fixed. Simultaneously, pressure is introduced to chamber 71 to release the clamping action of spring 74 so that the radius arm is conditioned for adjustment by handwheel 83.

Figure 3:
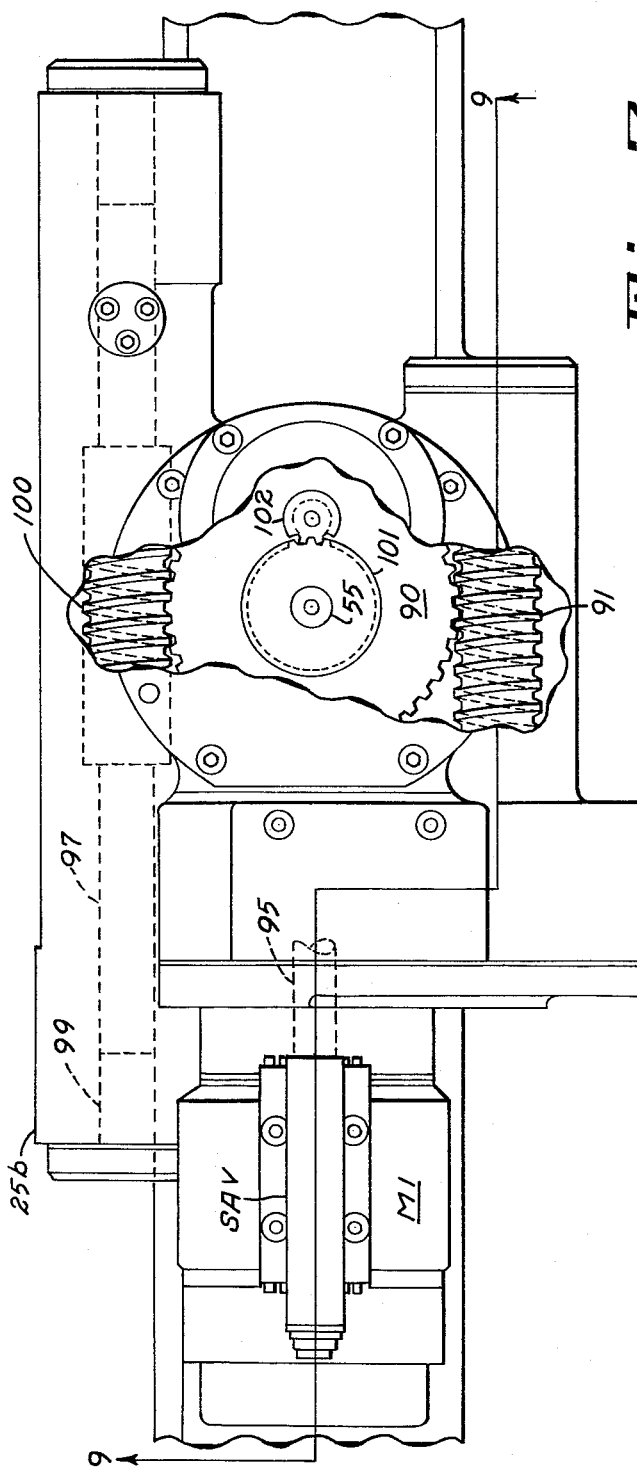
FIG. 3 is a view taken on the line 3—3 of FIG. 2.

As shown best in FIG. 5, the shaft 55 has keyed thereto a worm wheel 90 which is driven by worm 91 (see FIGS. 3 and 9) on a shaft 92 mounted by bearings 93 in the bridge. The shaft is connected by a gear train, indicated generally at 94, to the shaft 95 of hydraulic motor M1. A servo valve SAV, which controls the operation of the motor and hence the swinging of the arm 58, is mounted on the motor M1. A shaft 97 has a worm 100 engaged with worm wheel 90 and defines a piston received in cylindrical bore 99 in the bridge portion 25b. Hydraulic pressure is maintained in bore 99 against shaft 97 continuously to urge the teeth of worm wheel 90 against the threads of worm 91 and thereby eliminate backlash from the arm rotating mechanism. Shaft 55 also carries a gear 101 which engages a gear 102 on the rotor of a synchro control transformer TA whereby the rotor is rotated in accordance with the angular rotation of the arm 58. The gearing between shaft 55 and the rotor of transformer TA is such that the rotor turns less than 180°, say 170°, when the arm swings from its home position parallel to the planes of the wheels, as shown in FIG. 13a, to an extreme selected angular position, as shown in FIG. 13c or 13e.

Figure 7:
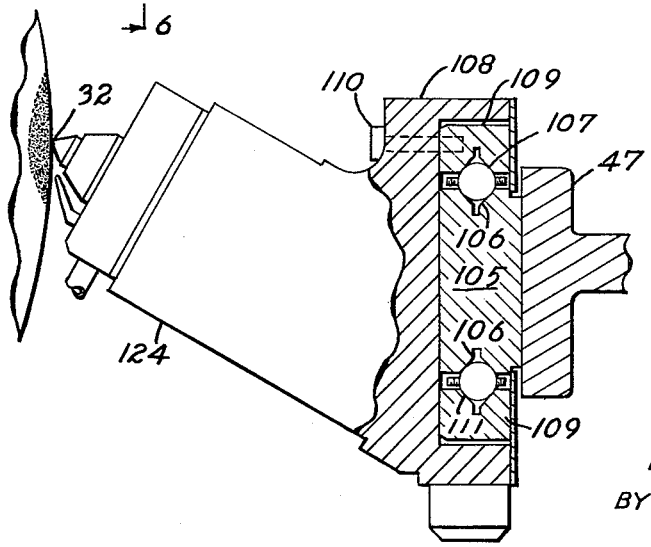
FIG. 7 is a view taken on the line 7—7 of FIG. 4.

The upper slide 47 has connected to its front face, as shown in FIG. 7, a horizontal guide bar 105 having grooves in its upper and lower surfaces constituting linear races 106 which receive balls 107. The races 106 extend parallel to the line 193 (FIG. 13a) between the centers of the arcs on the wheels and since the slide moves in translation the races 106 will remain parallel to this line of centers regardless of the angular position of the radius arm. A tool slide 108 has members 109 secured therein by bolts 110 which members straddle the guide bar 105 and have similar linear races 111 to receive balls 107 so that the tool slide 108 is movable on the upper slide 47 parallel to the line of centers between the arcs. As shown in FIGS. 6 and 10, a bracket 112 is connected to guide bar 105 and has a bearing 113 mounted therein which receives one end of a screw 114 extending through cavity 115 in the slide. The opposite end of the screw 114 is mounted in bearing 116 in gear box 117 which also is connected to the upper slide 47. A hydraulic motor M2, having a servo valve SBV mounted thereon, is connected to the housing 117 and drives the screw 114 through the gear train indicated generally at 118. A ball bearing nut 119 is connected to bracket 125 which is secured in the tool slide 108 and on rotation of the screw 114 the tool slide is shifted laterally relative to the upper slide 47. The screw 114 extends through gear box 117 into a second gear box 119 and carries two gears 120 and 121 therein. One gear 120 is connected by gear train 122 to the rotor of a synchro control transformer TB and the other gear 121 is connected to gear 123 mounted on the rotor shaft of control transformer TC.

The gearing between shaft 114 and control transformer TB is such as to rotate the rotor less than 180°, say 170°, as the cross slide 108 is shifted from a predetermined home position relative to the upper slide 47, as shown in FIG. 13a, to an extreme selected position thereon, as shown in FIG. 13b or 13d. The gearing between shaft 114 and the rotor of transformer TC is such to rotate that transformer many times, say 50, for each rotation of the rotor of transformer TB. The cross slide 108 has mounted thereon a tool carrying member 124 in which the diamond point 32 is mounted.

With the present invention a wide variety of pairs of arcuate surfaces can be quickly and accurately formed. For example, in FIGS. 11a, 11b, and 11c, are shown, schematically, three constructions with which three different pairs of circular contours can be formed. In each of the constructions, like the embodiment shown more fully herein, the radius 126a, 126b, or 126c of the arcs swung is determined by the length of the radius arms 58a, 58b, or 58c defined by the span between the fixed axes A1, A2, or A3 and the respective axes B1, B2, and B3 at which the arm is connected to the translatable slide 47a, 47b, or 47c. In each case also the wheel forming tool 32a, 32b, or 32c is shiftable laterally on the slide parallel to a line 127a, 127b, 127c between the centers C1a—C1b, C2a—C2b, C3a—C3b of the arcs. In each of the FIGS. 11a, 11b, and 11c the radius arms are shown in a predetermined home position, which may be any convenient angular position. The tool is shown in solid lines in a first selected position on the translatable slide (the tool slide by which the tool is mounted on the translatable slide not being shown in these schematic diagrams) where a line 128a, 128b, 128c between one of the arc centers and the tool is parallel to the arm. Thus when the arm is swung an arc of radius equal to the length of the radius arm is formed on the wheel. When the tool is shifted to a second selected position (shown in dotted lines) spaced from the first selected position a distance equal to the distance between centers of the arcs, and the arm is again swung, the second arc is formed.

The hydraulic circuit for the truing mechanism is shown in FIG. 12. A pump 130 delivers hydraulic fluid from a sump 131 to a pressure line 132, having a relief valve 133 therein for discharge into sump 131. The bore 99 in the bridge portion 25b of the support is connected through line 134, containing pressure reducing valve 135, to pressure line 132 to maintain a constant pressure on worm shaft 97. The system has a return line 136 and the pressure line 132 and return line 136 are connected to valve 137 which is operated by solenoid 4S. When the solenoid is energized, and valve member 138 shifted to the left, pressure line 132 is connected to lines 139 and 140. Line 139, containing pressure reducing valve 141, is connected to chamber 88 of the slide locking mechanism and line 140 is connected to chamber 71 of the radius arm clamping mechanism whereby the slide is locked and the radius arm clamp released to condition the radius arm for adjustment when solenoid 4S is energized. When solenoid 4S is deenergized, and valve member 138 is shifted to the right by spring 142, chambers 88 and 71 are connected to return line 136. This retracts the slide lock 84 and clamps the radius arm in its adjusted position.

The pressure line 132 is connected to pressure port 142' of servo valve SAV, which port communicates with a cross passage 143 in the shiftable valve member 144. The passage 143 communicates with chambers 145 and 146 at the ends of member 144 and terminates in orifices 147 and 148. A second shiftable member 149 carries a slug 150' between two coils 151 and 152 and is connected to the ends of pivotal arms 153 and 154. As current is greater in one or the other of the coils, the member 149 is shifted to swing the arms, increasing the gap at one of the orifices, 147 or 148, and decreasing the gap at the other. This causes a pressure differential between chambers 145 and 146 to shift member 144 in one direction or the other. As member 144 shifts to the left pressure from port 142' is connected through motor port 155 to one side of motor M1, and the other side of the motor is connected through motor port 156 to discharge port 157', thereby operating the motor in one direction. As member 144 shifts to the right motor port 156 is connected to pressure, and motor port 155 is connected to discharge port 158' to operate the motor in the reverse direction. Discharge ports 157' and 158' are connected to line 159', which contains throttle valve 160', and is connected to return line 136. The servovalve SBV controls motor M2 in the same manner valve SAV controls motor M1 and will not be further described.

In the truing cycle illustrated schematically in FIGS. 13a to 13e, a pair of circular arcs are formed, respectively, on two closely spaced wheels, the centers 191 and 192 of the arcs lying on a line 193 parallel to the common axis of the wheels and outboard of the wheels, said arcs being symmetrical about a center plane CP between the wheels. The arm 58 has a home position parallel to the center plane CP, and the tool slide 108 has a home position on slide 47 where the tool 32 lies in the center plane CP when arm 58 is in its home position, as shown in FIG. 13a. To true wheel 21 the slide 108 is shifted to a first selected position, as shown in FIG. 13b, where the diamond 32 lies on a line 194 through the center of the arc of wheel 21, which line is parallel to the arm 58. Since the arcs are symmetrical about the center plane CP, the first selected position of slide 108 on slide 47 is spaced from the center plane a distance $X/2$ equal to half the distance between the centers of the arcs, X. Thus, to true wheel 22, the slide 108 is shifted on slide 47 to a second selected position which is spaced from the home position of the slide a distance equal to the distance of the first selected position from the home position but on the opposite side thereof, as shown in FIG. 13d. The arm 58 has selected positions on either side of the home position angularly spaced a sufficient distance therefrom to true the span of the periphery of each wheel as the arm is swung to one or the other of said selected positions when the tool slide is in one or the other of its selected positions as shown in FIGS. 13c and 13e.

The movement of the truing device through the cycle is controlled by three sets SA, SB, and SC, of control synchros, shown in FIG. 14, each set comprising a control transformer, or synchro output element, and two transmitters, or synchro input elements, which are alternately connected to the control transformer. One set of synchros SA controls the swing of the radius arm 58 and the other two sets, SB and SC, control the movement of the tool slide 108 on the upper slide 47, one of said latter sets SB providing a coarse adjustment of the slide 108 and the other set SC a fine adjustment thereof. The transmitters may be mounted in a control panel (not shown) and each of the transmitter rotors is set in a predetermined position. Each of the transformer rotors is mechanically connected to the unit it controls so that the transformer rotor is rotated in accordance with the movement of the truing unit.

The rotor of one of the transmitters of each of the sets, the home position transmitter, when connected to the transformer of the set, is connected only as shown by the solid lines in FIG. 15. The rotor of the home position transmitter is set at a position P1 to produce a field F1 in the transformer when connected thereto of direction to produce a null, or zero, output voltage when the truing unit to which the transformer rotor is connected is in its home position. The arrow F1, and the arrows F2 and F3 later described, are not intended to show the actual direction of flux in the respective transformers, but instead are merely reference symbols to indicate the positions of the fields F1, F2, and F3 relative to each other.

The output voltage VHAB of the synchro sets SA or SB when the transformer (TA, TB) thereof is connected to the home position transmitter (XHA, XHB) at different angular positions of the transformer rotor, is shown in FIG. 16. The voltage output is zero when the truing unit is in the home position and when said unit is moved in one direction the output voltage varies in magnitude, as shown, and is in phase with the alternating supply voltage, said output voltage being indicated as positive in FIG. 16. When the unit is moved in the opposite direction the voltage output also varies in magnitude, as shown, but is 180 degrees out of phase with the supply voltage and is indicated as negative in FIG. 16. It will be understood that when synchro output voltage of one or the opposite polarity is referred to herein, said voltage will be alternating voltage and will be in phase with the supply voltage, or 180 degrees out of phase therewith, respectively.

The rotor of the other transmitter of the synchro sets SA or SB, the selected position transmitter (XSA, XSB), is set at a predetermined angle corresponding to the desired selected position of the truing unit. Thus, if movement of the slide 108 the distance $X/2$ (FIG. 13b) or the arms 58 through an angle $\alpha$ (FIG. 13c) corresponds to say $-170$ degree rotation of the control transformer TA or TB from the home position, the rotor of the selected position transmitter is set at a position corresponding to position P2 of FIG. 15, $-170$ degrees from the position P1 which would produce zero voltage output at the home position. Thus, when the selected position transmitter is connected to the control transformer as shown in solid lines in FIG. 15, a field F2 oriented $-170$ degrees from the field F1 induced by the home position transmitter, is induced therein and an output voltage VSAB-1 determined by the angular position of the transformer rotor relative to this field is produced by the synchro set SA or SB. This voltage, plotted as a function of shaft rotation relative to the home position, is shown for synchro sets SA or SB by solid line in FIG. 17, the voltage being zero when the transformer rotor is $-170$ degrees from its angular position at the home position.

When the lines corresponding to lines S1 and S3 of FIG. 15 connecting the stators of the selected position transmitter and the transformer of synchro sets SA or SB are reversed, as shown in dotted lines in FIG. 15, a field F3 is induced in the transformer, opposite to the angle of field F2 and $+170$ degrees relative to the field F1, even though the transmitter rotor remains in the position P2. The voltage VSAB2 produced by the synchro sets SA or SB with this connection is shown in dotted lines in FIG. 17, the voltage being zero at $+170$ degree angular rotation of the transformer rotor.

The transmitters of each synchro set are connected to a source 150 of 400 cycle supply voltage, and the transformers of each set are alternately connected to the transmitters of the set. The three lines 151a, 152a, and 153a between transformer TA and transmitter XSA, corresponding to the lines S1, S2, and S3 of FIG. 15, contain normally open contacts 8CR1, 8CR2, and 8CR3 of relay 8CR, respectively. Lines 151a and 153a contain normally closed contacts 16CR-1 and 16CR-2 which connect two stator windings of the transmitter with two stator windings of the transformer when closed, as shown in sold lines in FIG. 15, the connections being reversed through cross connecting lines containing normally open contacts 16CR3 and 16CR4 when the latter contacts are closed and the former open. The lines 154a, 155a, and 156a between transmitter XHA and transformer TA contain normally closed contacts 8CR4, 8CR5, and 8CR6 so that transmitter TA is connected to transmitter XSA when relay 8CR is energized, and is connected to transmitter XHA when that relay is deenergized. In synchro set SB the transformer TB is connected to the selected position transmitter XSB by lines 151b, 152b, and 153b, each containing a normally closed contact of relay 9CR (9CR1, 9CR2, 9CR3), the lines 151b and 153b containing normally closed contacts 12CR1 and 12CR2 of relay 12CR and cross connected by lines containing normally open contacts 12CR3 and 12CR4. The home position transmitter XHB is connected to transformer TB by lines 154b, 155b, and 156b containing normally open contacts of relay 9CR (9CR4, 9CR5, 9CR6) so that when relay 9CR is energized the transmitter XHB is connected to transformer TB and when that relay is deenergized transmitter XSB is connected to the transformer TB. In a similar manner the transmitters XSC and XHC are alternately connected to transformer TC, the lines 151c, 152c, and 153c between transmitter XSC and transformer TC containing, respectively normally closed contacts 11CR1, 11CR2, and 11CR3 of relay 11CR and the lines 154c, 155c, and 156c between transmitter XHC and transformer TC containing respectively normally open contacts 11CR4, 11CR5, and 11CR6 of that relay. The connection between transmitter XSC and transformer TC can be reversed by a relay 15CR which has normally closed contacts 15CR1 and 15CR2 in lines 151c and 153c and normally open contacts 15CR3 and 15CR4 in lines cross connecting these lines.

As shown in FIG. 18 two lines 157 and 158 are connected across a source 159 of alternating voltage. A D.C. power supply source 160 is connected across these lines (FIG. 20) and provides a D.C. voltage across lines 161 and 162. As shown in FIG. 14 the output voltage of synchro set SA is fed to amplifiers 163a and 164a which are connected across lines 157, 158 and lines 161, 162. A control unit 165a connected across lines 157, 158 and 161, 162 has a thyratron tube, the grid of which is connected to the output of amplifier 164a. The coil of relay 2CRA is connected in circuit with the thyratron tube and the tube is biased to conduct in the absence of signal from amplifier 165a so that the relay 2CRA is operated when a null, or zero, voltage is produced by synchro set SA. When any signal is produced by synchro set SA, the control tube stops conducting and relay 2CRA is dropped out.

The signal output of synchro set SA is amplified by amplifier 163a and supplied to a phase sensitive detector 166a connected by lines 167 and 168 to source 159. The detector 166a produces a D.C. operating voltage of polarity depending on the phase relation of the synchro set SA output to the supply voltage from source 150. This D.C. voltage is amplified by the push-pull power amplifier 169a, which is also connected across lines 161, 162, and 157, 158, the amplified voltage being fed to the servo valve SAV to produce a difference in current in the coils 151, 152. This current difference operates to shift the valve member 149 in one direction or the other depending on the phase relation of the output of synchro set SA to source 150, and drive the motor M1. This swings the radius arm in a direction to rotate the control transformer operatively connected thereto towards the null voltage position determined by the transmitter to which it is connected and, when the null voltage position is reached, the voltage supplied to the servo-valve SAV is zero and the motor M1 is stopped. When the voltage output of the synchro set SA is positive, as indicated in FIGS. 16 and 17, the arm 58 is swung counterclockwise about its axis A as viewed in FIG. 13c, while a voltage indicated as negative in FIGS. 16 and 17 will effect a clockwise movement thereof.

The transmitters of synchro set SB are geared to the corresponding transmitters of synchro set SC in the to the corresponding transmitters of synchro set SC in the same ratio as the transformers of these sets and the voltages produced by synchro set SC when connected to its respective transmitters are as shown in FIGS. 16 and 17. When transformer TC is connected to transmitter XHC the output of the synchro set is as shown at VHC in FIG. 16. When the transformer TC is connected to transmitter XSC the voltage is as shown in FIG. 17, voltage V1C being produced when the connection is similar to that shown in solid lines in FIG. 15 (relay 15CR deenergized) and the voltage V2C being produced when the connection is similar to that shown in dotted lines in FIG. 15 (relay 15CR energized). While the approximate selected position desired can be attained by setting transmitter XSB at the angle corresponding to the desired position, a much more exact positioning can be attained with transmitter XSC. The slide is controlled by synchro set SB until the transformer TC is in its final half revolution, as at A in FIG. 117, at which time the control of the slide is taken over by synchro set SC. The voltage produced by this set nulls at the precise desired position. In a similar manner transmitter XHC provides precise positioning at the home position.

The output of synchro set SB is connected to amplifier 164b and the amplified voltage therefrom is supplied to the thyratron control unit 165b and, through normally closed contact 1CRB1, to amplifier 163b. The thyratron control 165b operates a relay 1CRB in a manner similar to the operation of relay 2CRA by control unit 165a except that the thyratron tube of unit 165b is biased to operate relay 1CRB, not when the voltage produced by the transformer TB and the generator to which it is connected is reduced to zero with the movement of the slide, but, instead, when the voltage is reduced to a value corresponding to a predetermined distance of the slide from the slide position established by the connected transmitter, such as at point A in FIG. 17, a distance corresponding to less than a half revolution of the transformer TC.

The output of amplifier 164b, before operation of relay 1CRB, is supplied through amplifier 163b to phase detector 166b which, through amplifier 169b controls the servo valve SBV in the same manner as servo valve SAV is controlled, thus operating slide more M2 to move the slide in a direction toward the position defined by the connected transmitter of the synchro set. On operation of relay 1CRB synchro set SB and amplifier 164b are disconnected from amplifier 163b, and synchro set SC is connected to this latter unit through the normally open contact 1CRB2 to bring the slide to the precise desired position. The output of this latter synchro set is connected through amplifier 164c to thyratron control unit 165c which, like the operation of relay 2CRA by control unit 165a operates relay 2CRC when zero voltage is reached. The servo valve SBV is shifted in response to a voltage indicated as positive in FIGS. 16 and 17 to effect movement of slide 108 to the left on slide 47, as viewed in FIG. 13b, while a voltage indicated as negative in FIGS. 16 and 17 will shift the valve to effect movement of slide 108 to the right on slide 47, as shown in FIG. 13d.

Relay 4CR (FIG. 18) is connected in series across lines 157 and 158 with the lower contacts of selector switch 170 and when that switch is set to close said contacts relay 4CR is energized to close its normally open contact 4CR1. This will energize relay 9CR (FIG. 19), which is connected across lines 157 and 158 in series with contacts 4CR1, and close its normally open contact 9CR7 to energize relay 11CR connected across the supply lines in series with contacts 9CR7. With relay 8CR deenergized, and relays 9CR and 11CR energized, control transformers TA, TB, and TC (FIG. 14) are connected, respectively, to the home position transmitters XHA, XHB, and XHC and the truing members, the arm 58 and the slide 108, are moved from whatever position they occupy toward their home position, shown in FIG. 13a.

Three relays ACR, BCR, and CCR (FIG. 18) are connected across line 157 and 158, relay, ACR in series with normally open contact 2CRA1, relay BCR in series with normally open contact 1CRB3, and relay CCR in series with normally open contact 2CRC1. During the movement of the truing units the arm is under the control of synchro set SA and initially the slide is under the control of synchro set SB but, as the slide approaches the home position, relay 1CRB is energized, closing contacts 1CRB2 and opening contacts 1CRB1 (FIG. 14) to place the slide under the control of synchro set SC. At the same time contacts 1CRB3 are closed to energize relay BCR.

When the slide 108 and radius arm 58 are in their home positions relays 2CRA and 2CRC (FIG. 14) are energized, closing contacts 2CRA1 and 2CRC1 (FIG. 18) to energize relays ACR and CCR. The normally open contacts ACR1, BCR1, and CCR1 (FIG. 18) of these relays close to energize relay 5CR, which is connected in series with the lower set of contacts of the selector switch 170 and normally open contacts ACR1, BCR1, and CCR1 across lines 157 and 158. When selector switch 171 is closed, and normally open contacts 5CR1 are closed by energization of relay 5CR, relay 3CR is energized to close its normally open contacts 3CR1 and energize solenoid 4S. Energization of solenoid 4S conditions the radius arm for adjustment and, with the radius arm and slide at the zero position, the wheels 21 and 22 may be adjusted axially on their spindle so that the center plane CP lines up precisely with the diamond point.

After the set up adjustments have been made selector switch 170 is actuated to open its lower contacts and close its upper contacts, thereby deenergizing relay 4CR (and consequently relays 9CR and 11CR, FIG. 19) and relays 3CR and 5CR (FIG. 18). Deenergization of relay 3CR releases solenoid 4S and locks the radius arm at its adjusted length while deenergization of relays 9CR and 11CR disconnects synchro control transformers TB and TC from transmitters XHB and XHC, respectively, and connects these transformers to transmitters XSB and XSC (FIG. 14). Since transmitters XSB and XSC are set to correspond to a selected position of the slide 108 on the slide 147 spaced from the home position, and the slide 108 is at the home position thereon at this time, output voltages corresponding to points on voltage curves VSAB1 and V1C (FIG. 17), will be produced by synchro sets SB and SC, respectively, thereby deenergizing relays 1CRB, and 2CRC (FIG. 14) and deenergizing relays BCR, and CCR (FIG. 18). With contacts 1CRB1 closed and 1CRB2 open (FIG. 14) the slide 108 is initially under the control of synchro set SB and, by virtue of the voltage, as at 180 in FIG. 17, produced thereby at this time, the slide servo valve SBV is shifted in a direction to move the slide 108 to the left toward the position shown in FIG. 13b. When the slide approaches the selected position as at A, relay 1CRB is energized and control of the slide is taken over by the synchro set SC. The voltage in set SC at this time, indicated at 181 in FIG. 17, holds the servo valve in the same shifted position until the slide is brought to its precise selected position and the voltage of set SC nulls. When the slide 108 is in the position on the slide 47 as shown in FIG. 13b, relay 2CRC is energized and, therefore, at this time, relays ACR, BCR, and CCR are energized.

A stepping switch has three banks, or levels, of contacts SWA (FIG. 19), SWB (FIG. 18), and SWC (FIG. 19), (the contacts of the respective banks not electrically connected to each other) switch arms SAA, SAB, and SAC (FIG. 19) for said bank mechanically connected to move in unison, and a coil SS operable, when energized and subsequently deenergized, to move the respective switch arms to the next contact. One end of the stepping coil is connected to a rectifier circuit branch, indicated at 172 (FIG. 18), which is connected across lines 157 and 158, and the other end thereof is connected to the switch arm SAB of level SWB of the switch. With relays ACR, BCR and CCR energized, the normally open contacts ACR2, BCR2, and CCR2 thereof are closed and relay 1CR, connected in series with these contacts, the upper contacts of switch 170, normally closed stop switch 173, normally closed contacts 14CR1, and normally open cycle start switch 174, is energized when the latter switch is closed, normally open contact 1CR1 sealing in the relay around switch 174 and contacts ACR2, BCR2, and CCR2.

With switch arm SAB on contact 11 of switch bank SWB, and the normally open contact 1CR2 of relay 1CR closed, coil SS is energized since normally closed contact 7CR1 is closed at this time. This closes normally open contact SS1 and energizes relay 6CR, connected in series with contact SS1, normally open contacts ACR3, BCR3, CCR3, and normally closed contact 10CR1 across lines 157 and 158. This energizes relay 7CR through normally open contacts 6CR1 to open the normally closed contacts 7CR1 and deenergize stepping coil SS. This moves the arms of the stepping switch from contacts C11 to contacts C1. Contacts 6CR2 connected across contacts SS1 hold relays 6CR and 7CR energized, and hence contacts 7CR1 open, after coil SS is deenergized and contacts SS1 open.

When the switch arms reach contact C1 of their respective banks, relay 8CR (FIG. 19) is energized through arm SAC to open contacts 8CR4, 8CR5, and 8CR6 and close contacts 8CR1, 8CR2, 8CR3 (FIG. 14), thereby disconnecting the transmitter XHA from control transformer TA and connecting transmitter XSA thereto. Since the radius arm, at this time, is in its home position (as shown in FIG. 13b) and the transmitter XSA is set in a position corresponding to the angular position of the radius arm in a selected position spaced from the home position, a voltage is produced by synchro set SA, as at 182 in FIG. 17, and relay 2CRA is deenergized, dropping out relay ACR (FIG. 18), 6CR (FIG. 19) and 7CR, thereby closing contacts 7CR1. With a voltage produced by synchro set SA, motor M1 is operated to swing the arm 58 to its selected angular position as shown in FIG. 13c and thereby swing the diamond across the grinding wheel 21. Since the angular positioning of the arm is not as critical as the traverse positioning of the slide, there is no fine adjusting synchro set corresponding to the synchro set SC for the slide, and synchro set SA retains control of the arm during its entire movement, stopping the arm as the voltage produced thereby nulls.

When the radius arm reaches its selected position shown in FIG. 13c, and consequently the voltage from synchro set SA reaches zero, relay 2CRA is energized to close its normally open contacts, energizing relay ACR. When the normally open contact ACR4 connected to switch contact C1 of bank SWB (FIG. 18) closes, relay SS is energized through switch arm SAB and contacts 7CR1, and, as normally open contact SS-1 closes, relay 6CR is energized to energize relay 7CR. This opens contact 7CR1, dropping out coil SS, which causes the switch arms to move to contact C2.

When the switch arms move to contacts C2 relay 8CR is deenergized and the control transformer TA is again connected to transmitter XHA. Thus, a voltage is produced in synchro set SA corresponding to 183 in FIG. 16, to shift the servo valve SAV and drive the arm 58 clockwise toward a position corresponding to the home position set by transmitter XHA, i.e. toward the home position shown in FIG. 13b. While synchro set SA produces a voltage output, relay 2CRA is deenergized, dropping out relays ACR, 6CR, and 7CR and closing contacts 7CR1. When the radius arm returns to the position of FIG. 13b, relay 2CRA is picked up, energizing relay ACR and thus coil SS through contacts ACR4. Thus relay 6CR and relay 7CR are again energized to open contacts 7CR1 and deenergize coil SS, causing the switch arms to shift to contacts C3.

With the switch arms on contacts C3 relay 9CR (FIG. 19) is energized through switch arm SAC and hence relay 11CR is energized, and transformers TB and TC become disconnected from transmitters XSB and XSC and become connected, respectively, to transmitter XHB and XHC. These latter transmitters are set to correspond to the home position of the slide 108 on the slide 47 and, therefore, the synchro set SB produces a voltage as at 184 in FIG. 16 to shift the slide servo valve SBV to move the slide to the right toward the home position shown in FIG. 13a. Thus relays 1CRB and 2CRC (FIG. 14) are deenergized, dropping out relays BCR, CCR, 6CR, and 7CR, thereby closing contacts 7CR1. As the slide approaches the home position relay 1CRB is picked up, energizing relay BCR, to thereby energize coil SS through normally open contacts BCR4, switch arm SAB and contacts 7CR1. At the same time relay 6CR is energized through contacts SS1, 10CR1, ACR3, BCR3, and normally open contacts 11CR7, thereby energizing relay 7CR to drop out coil SS. This switches the switch arms to contacts C4. It will be noted that with contacts 11CR7 connected around contacts CCR3, the stepping switch is operated before contacts CCR3 close which occurs when synchro set SC nulls and relay 2CRC is operated. This is done since precise positioning of the slide 108 on slide 47 is not required in this portion of the cycle.

As the switch arms move to contacts C4, relays 9CR and 11CR are deenergized thereby reconnecting the slide control transformers TB and TC to the selected position transmitters XSB and XSC. At the same time relay 12CR (FIG. 19) is energized through the arm SAA of level SWA of the switch, the contacts 12CR5 of this relay closing to energize relay 15CR. The energization of relays 12CR and 15CR reverse the sequence of connections between the transmitters and transformers to produce voltages in synchro sets SB and SC on the voltage curves VSAB2 and V2C shown in dotted lines in FIG. 17. At this time the voltage in synchro set SB is as shown at 185 in FIG. 17 and relay 1CRB is thereby deenergized, placing synchro set SB in control of the motor. This voltage holds the servo valve SBV in the same position and the slide 108 continues moving to the right toward the position shown in FIG. 13d. As relay 1CRB becomes deenergized, relay BCR (FIG. 18) drops out, dropping out relays 6CR and 7CR to close contacts 7CR1. Except for the direction of movement, this movement is controlled in a similar manner to the movement of the slide from the home position to the position of FIG. 13b. Thus as the slide approaches its selected position shown in FIG. 13d relay 1CRB and BCR becomes energized to cut out synchro set SB and cut in synchro set SC and the slide stops at its precise selected position as previously described. At the final position of the slide relay 2CRC is energized, thereby energizing relay CCR (FIG. 18) through contacts 2CRC1. As relay 1CRB became energized, stepping coil SS was energized through contacts BCR4, switch contact C4, and arm SAB, closing contacts SS1. Thus when contacts CCR3 close on the subsequent energization of relay CCR, relays 6CR and 7CR are energized, and coil SS is dropped out, shifting the switch arms to contact C5.

When the switch arms reach contacts C5 relay 8CR is energized through switch arm SAC and contact C5, thus closing contacts 8CR1, 8CR2, 8CR3 and opening contacts 8CR4, 8CR5, 8CR6 to connect the radius arm control transformer TA to the selected position transmitter XSA (FIG. 14). At the same time normally open contact 8CR7 is closed to energize relay 16CR (FIG. 19), opening contacts 16CR1, 16CR2 and closing contacts 16CR3, 16CR4 (FIG. 14). This reverses two of the connections between the transmitter XSA and transformer TA and a voltage as at 186 (FIG. 17) is produced by the synchro set SA shifting the servo valve SAV to effect clockwise movement of the arm 58. This swings the radius arm toward the position shown in FIG. 13e. Relay 2CRA is deenergized while there is a voltage output from synchro set SA and therefore relay ACR (FIG. 18), 6CR, and 7CR are dropped out, closing contacts 7CR1. Relay 2CRA becomes energized when the voltage nulls at the position of FIG. 13e. This energizes relay ACR, and, through contacts ACR4, switch contact C5, arm SAB and contacts 7CR1, stepping coil SS is energized. As contact SS1 closes, relay 6CR, and hence 7CR, become energized, dropping out coil SS and shifting the switch arms to contact C6.

As the switch arm SAC (FIG. 19) moves off contact C5 relay 8CR is deenergized, and hence relay 16CR, which is connected in series with contact 8CR7, is deenergized. Thus transformer TA is reconnected to transmitter XHA and the lines between transmitter XSA and transformer TA are returned to their initial sequence. At this time a voltage output as at 187 will be developed by synchro set SA and the servo valve SAV will be shifted to effect counterclockwise movement of the radius arm 58 to return the radius arm to its home position as shown in FIG. 13d. While there is a voltage output from synchro set SA, relay 2CRA is deenergized which drops out relay ACR, 6CR, and 7CR to close contacts 7CR1, but relay 2CRA is picked up as the arm reaches its home position as shown in FIG. 13d. Relay ACR (FIG. 18) is picked up at this time through contacts 2CRA1, and contacts ACR4 closed. This energizes coil SS through contacts ACR4, contact C6, and contacts 7CR1 to close contacts SS1. Relay 6CR is picked up, thereby energizing relay 7CR through contact 6CR1, and thus contacts 7CR1 open to drop out coil SS. This shifts the switch arms to contact C7.

As the switch arm SAA (FIG. 19) leaves contact C6 relays 12CR and 15CR are deenergized. This returns the lines between the selected position transmitters XSB and XSC and the transformers TB and TC of synchro sets SB and SC, respectively, to their initial sequence (FIG. 14). When the switch arm SAC reaches contact C7 relay 9CR is energized, and thus relay 11CR is energized through contacts 9CR7. This connects the slide control transformers TB and TC to the home position transmitters XHB and XHC, respectively. Voltages, as shown in FIG. 16, are thus developed in synchro sets SB and SC which deenergize relays 1CRB and 2CRC, thereby dropping out relays BCR, CCR, 6CR, and 7CR to close contacts 7CR1 (FIG. 18). With contacts 1CRB1 (FIG. 14) closed, a voltage as at 188 (FIG. 16) shifts the servo valve SBV to move the slide toward the left and the home position as shown in FIG. 13a. When the slide is close to this home position, relay 1CRB is energized, closing contacts 1CRB3 (FIG. 18) to energize relay BCR and close contacts BCR4. Thus the stepping switch coil SS is energized through contacts BCR4, switch contact C7, arm SAB, and contacts 7CR1, closing contact SS1. Relay 6CR is picked up at this time through contacts SS1, 10CR1, ACR3, BCR3, and 11CR7, energizing relay 7CR through contacts 6CR1. This opens contacts 7CR1 and drops out coil SS, opening switch SS1 at the same time. As the coil SS drops out, the switch arms shift to switch contacts C8.

When the switch arm SAC (FIG. 19) leaves contacts C7, relay 9CR, together with relay 11CR, is dropped out. This connects the slide control transformers TB and TC (FIG. 14) to selected position transmitters XSB and XSC respectively. It will be noted again, that the slide transformers are immediately connected to the selected position transmitters as soon as relay 1CRB is dropped out, instead of waiting until a null voltage is produced by synchro set SC, since precise positioning at the home position of FIG. 13a is not critical at this time.

The voltage produced by synchro set SB at this time is as shown at 189 and the servo valve is held in the position to effect movement of the slide 108 to the left. This moves the slide toward the position shown in FIG. 13b. Relay 1CRB is deenergized during movement of the slide toward the selected position shown in FIG. 13b, and therefore relays BCR, 6CR, and 7CR (FIG. 18) are dropped out, closing contacts 7CR1. As the slide approaches the position shown in FIG. 13b, relay 1CRB is picked up and the relay BCR is picked up at the same time to close contacts BCR4. Thus stepping coil SS is energized through contacts BCR4, contacts C8, arm SAB, and contacts 7CR1. This closes contacts SS1 but relay 6CR is not picked up until contact CCR3 closes, since at this time contacts 11CR7 are open. When relay 1CRB became energized, contacts 1CRB1 opened and 1CRB2 closed (FIG. 14) and synchro set SC took control of the slide. When the voltage output of synchro set SC nulls at the position shown in FIG. 13b relay 2CRC is picked up, energizing relay CCR (FIG. 18) through contacts 2CRC1, thereby closing contacts CCR3. Thus relay 6CR is energized, energizing relay 7CR through contacts 6CR1, to open contacts 7CR1 and drop out coil SS.

This steps the switch arms to contact C9. Relay 10CR (FIG. 19) is energized through switch arm SAC and relay 13CR through switch arm SAA. Energization of relay 10CR opens normally closed contacts 10CR1 to drop out relay 6CR and, since contacts SS1 are open at this time, relay 7CR is dropped out closing contacts 7CR1. Energization of relay 13CR closes contacts 13CR1 to energize relay 1TR, which relay has normally open contacts 1TR1 which close to initiate a conventional compensating mechanism 28 which shifts the support member 25 a predetermined amount toward the grinding wheels. Relay 1TR has a normally open delay close contact 1TR2 which closes after a sufficient time for compensation has elapsed, energizing step coil SS through contacts 1TR2, switch contact C9, switch arm SAB, and normally closed contacts 7CR1, thereby closing contacts SS1. When relay 10CR was energized contacts 10CR2 closed, permitting energization of relay 7CR at this time through contacts SS1 and 10CR2. This opens contacts 7CR1 to deenergize the coil SS and steps the switch to contact C10, dropping out relay 13CR. This drops out relay 1TR and, when contacts SS1 open, relay 7CR is dropped out, thereby closing contacts 7CR1. When switch arm SAA (FIG. 19) reaches contact C10, and after the normally closed instant open, delay close contact 1TR3 of relay 1TR closes, relay 14CR is energized through arm SAA, normally closed contact 1TR4, and contacts 1TR3, thereby closing contacts 14CR2 (FIG. 18) and opening contacts 14CR1. This deenergizes relay 1CR and energizes the stepping coil through contacts 14CR2, arm SAB, and contacts 7CR1. This steps the switching arms to their initial positions on contacts C11, deenergizing relays 10CR and 14CR (FIG. 19), and since relay 1CR is deenergized and 1CR2 open, terminates the cycle.

It will be noted that the truing mechanism can be quickly adjusted for different jobs. It is only necessary to adjust the angular setting of the selected position transmitters (within 180° rotation of transformers TA and TB from the home position) to alter the spacing between the centers of the arcs and it is only necessary to adjust the length of the radius arm by rotation of handwheel 83 to alter the radius of the contoured arcs. If two arcs of different radii are to be contoured in a single contouring cycle, the radius arm can be adjusted after the first arc is formed.

What is claimed is:

1. In a grinding machine having a grinding wheel, a mechanism for truing a contour defining in cross section a circular arc of selected radius on the periphery of said wheel, the mechanism comprising a support member, a lower slide mounted on the support member for reversible movement thereon in one direction, an upper slide mounted on the lower slide for reversible movement thereon in a direction transverse to said one direction, a wheel forming tool operatively connected to the upper slide, an arm pivotally connected on an axis to the support member and swingable about said axis in a plane parallel to the plane of movement of the upper slide, a pin received in said arm and upper slide to define a pivotal connection therebetween, said pin shiftable in the arm and upper slide to a distance equal to said selected radius from said axis to define the circular arc through which the upper slide and tool is swung, and means to shift the support member relative to the grinding wheel.

2. In a grinding machine having a grinding wheel, a mechanism for truing a contour defining in cross section a circular arc of selected radius on the periphery of said wheel, the mechanism comprising a support member having an overhanging bridge, a lower slide mounted on the support member for reversible movement thereon in one direction, an upper slide mounted on the lower slide for reversible movement thereon in a direction transverse to said one direction, a wheel forming tool operatively connected to the upper slide, an arm pivotally connected to the bridge on an axis and swingable about said axis is a plane parallel to the plane of movement of the upper slide, a pivot pin mounted in the arm and upper slide and adjustably shiftable therein to a distance from said axis equal to said selected radius, means to clamp said upper slide to effect shifting of the pin, means to adjustably shift said support relative to the grinding wheel, and means to swing said arm to effect a truing operation on the wheel.

3. In a grinding machine, a grinding wheel truing mechanism to contour a pair of circular arcs of like radii having spaced centers lying on a line, the mechanism comprising a support member, a first slide, means to mount said first slide on said support member for universal movement in translation in a plane, a second slide having a wheel forming tool extending therefrom, said second slide mounted on the first slide for movement in translation therewith and shiftable thereon parallel to said line to predetermined positions, and means defining a radius arm pivotally connected to the support member for swinging about an axis, said arm pivotally connected to the first slide at a point on said arm spaced from said axis a distance equal to the radii of said arcs.

4. In a grinding machine, a grinding wheel truing mechanism to contour a pair of circular arcs having like radii and spaced centers lying on a line, the mechanism comprising a support member adjustably movable perpendicular to the line of centers of said arcs, a lower slide mounted on said support member for reversible movement in one direction, an upper slide mounted on said lower slide for reversible movement in a direction transverse to the movement of said lower slide whereby said upper slide is mounted for universal movement in a plane in translation relative to said support member, a tool slide having a wheel forming tool extending therefrom, said tool slide mounted on the upper slide and shiftable parallel to said line to predetermined positions thereon, an arm pivotally connected to the support member for swinging parallel to said plane of translation of said upper slide, and a pin connected to said upper slide and mounted on said arm, said pin shiftable on the arm to a point spaced from said axis an amount equal to said radii.

5. A truing mechanism for truing a pair of grinding wheels, said wheels having respective peripheries comprising in cross section portions of circular arcs having like radii and spaced centers lying on a line, the mechanism comprising a support member fixed relative to the grinding wheels during truing and adjustably movable perpendicularly to the line of centers of said arcs, said support member having a pair of spaced parallel shafts mounted thereon and having an overhanging bridge, a lower slide mounted on the shafts of the support member for movement therealong, said lower slide having a pair of spaced parallel shafts perpendicular to said shafts on the support member, an upper slide mounted on the shafts of the lower slide for movement therealong, whereby said upper slide is mounted for universal movement in a plane in translation relative to the support member, a tool slide having a wheel forming tool extending therefrom, said tool slide mounted on the upper slide and shiftable parallel to said line of centers of said arcs to predetermined positions on said upper slide, an arm pivotally connected to the bridge for swinging about an axis in a plane parallel to the plane of translation of the upper slide, and a pin received in said arm and said upper slide, said pin shiftable in said members radially relative to said axis to a distance therefrom equal to said radii.

6. In a grinding machine, a truing mechanism to contour a pair of circular arcs with like radii and centers lying on a line spaced a predetermined distance apart, the mechanism comprising a support member, a first slide, means to mount said first slide on said support member for movement in translation in a plane, a second slide having a wheel forming tool extending therefrom, said second slide mounted on the first slide and shiftable thereon parallel to said line of centers of said arcs, means defining a radius arm pivotally connected to the support member for swinging in a plane parallel to the plane of translation of said first slide, said arm pivotally connected to the first slide at a point on said arm spaced from said axis a distance equal to the radii of the circular arcs, means to swing the radius arm to a predetermined angular position, means to shift the second slide to a first predetermined position on the first slide where the wheel forming tool lies on a line through one of said arc centers and parallel to the radius arm, means to shift the second slide on the first slide to a second predetermined position a distance equal to the distance between centers of said arcs from said first predetermined position, and means to oscillate said radius arm.

7. In a grinding machine, a truing mechanism to contour a pair of circular arcs having like radii and centers lying on a line spaced a predetermined distance apart, said arcs being symmetrical about a center plane normal to said line, the mechanism comprising a support member, a first slide, means to mount said first slide on said support member for universal movement in translation in a plane, a second slide having a wheel forming tool extending therefrom, said second slide mounted on the first slide for movement in translation therewith and shiftable thereon parallel to the line of centers of the arcs, means defining a radius arm pivotally connected on an axis to said support member and swingable in a plane parallel to the plane of translation of said first slide, said arm pivotally connected to the first slide at a point on said arm spaced from said axis a distance equal to the radii of the circular arcs, means to swing the arm to a predetermined angular position, means to shift the second slide to a first predetermined position on the first slide where the wheel forming tool lies on a line through the center of one of said arcs and parallel to the radius arm when said arm is at said predetermined angle, means to swing the arm on one side of said predetermined angular position to true said one of said arcs, means to shift the second slide to a second predetermined position on the first slide spaced from said first predetermined position thereon a distance equal to the distance between said centers of the peripheral arcs, means to swing the arm on the other side of said predetermined angular position of the arm to true the other of said arcs, and means to effect relative shifting of said support member perpendicular to said line of centers.

8. A truing mechanism for truing a pair of grinding wheels having respective peripheries defining in cross section arcs having like radii and centers lying on a line, said arcs being symmetrical about a center plane between the wheels normal to the line of centers of the arcs, the mechanism comprising a support, a first slide, means to mount the first slide on said support for universal movement in translation in a plane, a second slide having a wheel forming tool extending therefrom mounted on the first slide and shiftable thereon parallel to said line, means defining a radius arm pivotally connected on an axis to said support member and swingable in a plane parallel to the plane of translation of said first slide, said arm pivotally connected to the first slide at a point on said arm spaced from said axis a distance equal to the radii of the peripheral arcs, means to swing said radius arm to a predetermined home position parallel to the center plane between the wheels, means to shift the second slide from a predetermined home position on the first slide where the tool lies in the center plane between the wheels to a first selected position spaced from said home position an amount equal to the distance on said line from the center plane between the wheels to the center of the peripheral arc of one of said wheels, means to oscillate said arm on one side of its home position, means to shift the second slide to a second selected position a distance equal to the distance of the first selected position from its home position on the opposite side thereof, means to oscillate said arm on the opposite side of its home position, and means to shift said support relative to the grinding wheels.

9. A truing mechanism for truing a pair of grinding wheels having respective peripheries defining in cross section circular arcs having like radii and centers lying on a line, said arcs being symmetrical about a center plane between the wheels normal to the line of centers of the arcs, the mechanism comprising, a support, a lower slide mounted on the support for reversible movement thereon in one direction, an upper slide mounted on the lower slide for reversible movement thereon in a direction transverse to said one direction whereby said upper slide is universally movable in a plane in translation relative to said support, a tool slide having a wheel forming tool extending therefrom mounted on the upper slide for movement parallel to said line of centers, a radius arm pivotally connected on an axis to said support and swingable in a plane parallel to the plane of translation of said upper slide, means to swing the arm to a predetermined angular home position parallel to said center plane, a pin mounted in said arm and said upper slide parallel to said axis and movable in said arm and slide radially relative to said axis when the arm is in said predetermined angular home position to a position spaced from said axis a distance equal to the radii of said arcs, means to shift the tool slide from a predetermined home position on the upper slide where the wheel forming tool lies in the center plane between the wheels to a first selected position spaced from said home position an amount equal to the distance on said line from the center plane to the center of the peripheral arc of one of said wheels, means to oscillate said arm on one side of its predetermined home position, means to shift the tool slide to a second selected position a distance equal to the distance of the first selected position from its home position on the opposite side thereof, means to oscillate said arm on the opposite side of its predetermined home position, and means to shift said support relative to the grinding wheels.

10. In a grinding machine, a wheel truing mechanism for forming a contour defining in cross section a circular arc on the periphery of the wheel comprising in combination a support, a wheel forming tool, means to mount the wheel forming tool for universal movement in a plane in translation relative to the support, a member pivotally connected on an axis to the support and swingable about said axis between a first and a second predetermined angular position, means operatively connecting the tool to said member at a point spaced from said axis, a synchro transformer operatively connected to said member for rotation less than 180 degrees as said member swings between said predetermined positions, a first and a second synchro transmitter selectively connectable electrically one at a time to said transformer, said first transmitter having a rotor angularly set to produce a null voltage output at the transformer when connected thereto when said member is in the first predetermined angular position and a voltage of predetermined polarity when the member is angularly spaced from said first predetermined position, said second transmitter having a rotor angularly set to produce a null voltage output at the transformer when connected thereto when the member is in the second predetermined angular position and a voltage of polarity opposite to said predetermined polarity when the member is angularly spaced from said second predetermined position, power means operatively connected to said swingable member, control means operatively connected to said power means responsive to the transformer voltage output of said predetermined polarity to swing said member to said first predetermined position and responsive to the transformer voltage output of said opposite polarity to swing said member to said second predetermined angular position, means to connect said first transmitter to said transformer to swing the forming tool across the wheel from said second predetermined position to said first predetermined position, and means to connect said second transmitter to said transformer to return the forming tool to said second predetermined position.

11. In a grinding machine, a wheel truing mechanism comprising a support, a first slide member, means to mount said first slide member on said support for universal movement in translation in a plane, a second slide member having a wheel forming tool extending therefrom mounted on the first slide for movement in translation therewith and shiftable thereon, a first synchro control transformer operatively connected to the second slide for rotation in accordance with movement thereof on the first slide, means defining a radius arm pivotally connected to the support for swinging about an axis, said arm pivotally connected to the first slide at a point on said arm spaced from said axis, a second synchro control transformer operatively connected to the arm for rotation in accordance with swinging movement thereof, two pair of synchro transmitters, one of said pair comprising two transmitters alternately connected to the first control transformer and set at predetermined spaced apart angles corresponding to spaced slide positions, and the other of said pair comprising two transmitters alternately connected to the second control transformer and set at predetermined spaced apart angles corresponding to spaced angular positions of the arm, means responsive to the relative angular position of each of said control transformers, respectively, to the transmitter connected thereto to move the members operatively connected to the respective control transformers to the position corresponding to the angular position of the connected transmitter, and a switching control circuit operable in response to predetermined voltages at said transformers to connect selected transmitters to the transformers to move the wheel forming tool through a predetermined cycle.

12. In a grinding machine, a wheel truing mechanism comprising a support, a first slide member, means to mount said first slide member on the support for movement in translation in a plane, a second slide member having a wheel forming tool extending therefrom mounted on the first slide and shiftable laterally thereon in one direction from a predetermined home position to a first selected position and shiftable oppositely the same amount to a second selected position, a first synchro control transformer operatively connected to the second slide for rotation in one direction less than 180 degrees as said second slide moves from the home position to the first predetermined position and rotation a like amount oppositely as said slide moves from the home position to the second predetermined position, means defining a radius arm pivotally connected to the support for swinging about an axis between a predetermined home position and a selected position, said arm pivotally connected to the first slide at a point on said arm spaced from said axis, a second synchro control transformer operatively connected to the arm for rotation less than 180 degrees as said arm swings between the home position and the selected position, a first pair of transmitters comprising a home position transmitter and a selected position transmitter each having stator lines selectively connectable to the first control transformer, at least two of the lines of the selected position transmitter being reversible, said home position transmitter having a rotor angularly set to produce a null voltage output at the transformer when connected thereto and when said second slide is in the home position, said transformer thereby producing a voltage of predetermined polarity when the second slide member is spaced from said home position, said selected position transmitter having a rotor angularly set to produce a null voltage output at the transformer when connected thereto in predetermined sequence and when said second slide member is at one of said predetermined selected positions and to produce a null voltage output at the transformer when connected thereto in reverse sequence and when said second slide member is at the opposite selected position, a second pair of transmitters comprising a home position transmitter and a selected position transmitter selectively connectable to the second control transformer, said home position transmitter having a rotor angularly set to produce a null voltage output at the transformer when connected thereto when the arm is at the home position and said selected position transmitter having a rotor angularly set to produce a null voltage at the transformer when connected thereto when said arm is at the selected position, power means responsive to the voltage output at said first transformer to move the second slide on the first slide, power means responsive to the voltage output at said second transformer to swing the arm, and means selectively to connect the transmitters to the transformers and to reverse the stator lines between the selected position transmitter and transformer of said first pair.

13. In a grinding machine, a truing mechanism for truing a pair of grinding wheels having respective peripheries defining in cross section circular arcs having like radii and centers lying on a line, said arcs being symmetrical about a center plane between the wheels normal to the line of centers of the arcs, the mechanism comprising in combination, a support, a first slide, means to mount the first slide on the support for universal movement in a plane in translation, a second slide having a forming tool extending therefrom mounted on said first slide for movement thereon parallel to a line between said centers from a predetermined home position with the forming tool in the center plane to a first selected position on one side of said home position and to a second selected position a like distance on the opposite side of said home position, a member pivotally connected to said support and swingable about an axis, said member pivotally connected to said first slide at a point spaced from said axis, said member swingable from a predetermined home position to a first selected position on one side of said home position and to a second selected position a like distance on the opposite side of said home position, a first and a second control transformer operatively connected, respectively, to the slide and the arm for rotation in response to movement thereof, a first and a second pair of synchro transmitters, each of said pair comprising a home position transmitter and a selected position transmitter having rotors set at spaced apart angles, each transmitter of one pair selectively connectable one at a time to said first control transformer and each transmitter of the other pair selectively connectable one at a time to said second control transformer, each of said selected position transmitters having at least two stator lines connectable selectively to the respective transformers in predetermined sequence and in reverse sequence, power means operable in response to the voltage output of said first control transformer to move said slide, power means operable in response to the voltage output of said second control transformer to swing said arm, and means sequentially to connect the selected position transmitter of said first pair to said first control transformer with the stator lines in predetermined sequence, to connect the selected position transmitter of said second pair to said second control transformer with the stator lines in predetermined sequence, to connect the home position transmitter of said second pair to said second control transformer, to connect the home position transmitter of said first pair to said first control transformer, to connect the selected position transmitter of said first pair to said first control transformer with the stator lines in reverse sequence, to connect the selected position transmitter of said second pair to said second control transformer with the stator lines in reverse sequence, and to connect the home position transmitter of said second pair to said second control transformer.

14. In a machine tool, a first machine member movable along a predetermined path between a first predetermined position and a second predetermined position and a second machine member movable along a predetermined path between a first predetermined position and a second predetermined position, each of said machine members having an electrical synchro output element operatively connected thereto for rotation less than 180 degrees as said members move between said positions, a first pair of electrical synchro input elements electrically connectable one at a time to the synchro output element rotated by the first machine member and a second pair of electrical synchro input elements electrically connectable one at a time to the synchro output element rotated by the second machine member, one synchro input element of each pair having a rotor angularly set to produce a null voltage output when connected to the synchro output element to which it is connectable when the machine member which rotates said synchro output element is in the first predetermined position and to produce a voltage of predetermined polarity when said machine member is spaced from said first predetermined position, the other synchro input element of each pair having a rotor angularly set to produce a null voltage output when connected to the synchro output element to which it is connectable when the machine member which rotates said synchro output element is in the second predetermined position and to produce a voltage of polarity opposite to said predetermined polarity when said machine member is spaced from said second predetermined position, a motor connected to each machine member for movement thereof, an electrically operated control member connected to each motor for operation thereof, each control member electrically connected to receive the voltage output determined by the position of one machine member to run the motor to which the machine member is connected in one direction in response to a voltage output of said predetermined polarity and to run said motor oppositely in response to a voltage output of said opposite polarity, and a control circuit to effect selected coordinated connection of the synchro input elements of each pair one at a time to the synchro output elements to which they are connectable to thereby effect coordinated operation of said motors to move said machine members through a predetermined cycle.

15. In a machine tool having a forming tool and means to mount a member for contouring by the tool, mechanism to effect relative movements between said tool and said member in a predetermined sequence comprising in combination a first slide movable along a predetermined path between a first predetermined position and a second predetermined position and a second slide movable along a predetermined path between a first predetermined position and a second predetermined position, each of said slides having an electrical synchro output element operatively connected thereto for rotation less than 180 degrees as said slides move between said positions, a first pair of electrical synchro input elements electrically connectable one at a time to the synchro output element rotated by the first slide and a second pair of electrical synchro input elements electrically connectable one at a time to the synchro output element rotated by the second slide, one synchro input element of each pair having a rotor angularly set to produce a null voltage output in the synchro output element to which it is connectable when connected thereto when the slide which rotates the synchro output element is in the first predetermined position and to produce a voltage of predetermined polarity when said slide is spaced from said first predetermined position, the other synchro input element of each pair having a rotor angularly set to produce a null voltage at the synchro output element to which it is connectable when connected thereto when the slide which rotates the synchro output element is in the second predetermined position and to produce a voltage of polarity opposite to said predetermined polarity when said slide is spaced from said second predetermined position, a motor connected to each slide for movement thereof, an electrically operated control member connected to each motor for operation thereof, each control member electrically connected to one of the synchro output elements to run the motor to which it is connected in one direction in response to a synchro output element voltage output of said predetermined polarity and to run said motor oppositely in response to a synchro output element voltage output of said opposite polarity, and a control circuit including circuit elements responsive to predetermined voltage levels at said synchro output elements to effect selected connection of the synchro input elements of each pair one at a time to the synchro output elements to which they are connectable and to run said motors one at a time to effect a predetermined coordinated succession of relative movements between the contouring tool and the member to be contoured.

16. In a machine tool having a forming tool and means to mount a member for contouring by the tool, mechanism to effect successive relative movements between said member and said tool in a predetermined succession comprising in combination a first slide movable along a predetermined path between first and second selected positions equally spaced on each side of a predetermined home position and a second slide movable along a predetermined path on said first slide between first and second selected positions equally spaced on each side of a predetermined home position, each of said slides having an electrical synchro output element operatively connected thereto for rotation less than 180 degrees as said slides move from said home positions to said selected positions, a home position and a selected position synchro input element electrically connectable one at a time to the synchro output element rotated by the first slide and a home position and a selected position synchro input element electrically connectable one at a time to the synchro output element rotated by the second slide, each of said home position synchro input elements having a rotor angularly set to produce a null voltage output in the synchro output element to which it is connectable when connected thereto when the slide which rotates the synchro output element is in the home position, each of said home position synchro input elements thereby producing a voltage of predetermined polarity when said slide is spaced toward said first selected position from said home position and a voltage of opposite polarity when said slide is spaced toward said second selected position from said home position, each of said selected position synchro input elements angularly set to produce a null voltage at the synchro output element to which it is connectable when connected thereto in a predetermined sequence when the slide which rotates the synchro output element is in the first selected position and to produce a null voltage at the synchro output element to which it is connectable when connected thereto in reverse sequence when the slide which rotates the synchro output element is in the second selected position, each of said selected position synchro input elements producing a voltage of said opposite polarity at the synchro output element to which it is connectable when connected thereto in said predetermined sequence when the slide which rotates the synchro output element is spaced toward said home position from said first selected position and producing a voltage of said predetermined polarity at the synchro output element to which it is connectable when connected thereto in said reverse sequence when the slide which rotates the synchro output element is spaced toward said home position from said second selected position, a motor connected to each slide for movement thereof, an electrically operated control member connected to each motor for operation thereof, each control member electrically connected to one of the synchro output elements to run the motor to which it is connected in response to a synchro output element voltage output of said predetermined polarity and to run said motor oppositely in response to a synchro output of said opposite polarity, and a control circuit having a stepping switch and circuit elements responsive to predetermined voltage levels at said synchro output elements to step said switch, said switch operable to effect selected connection of the synchro input elements of each pair one at a time to the synchro output elements to which they are connectable and to effect selected reversal of connection of the selected position synchro input elements for operation of said motors one at a time in predetermined order and direction to effect a coordinated predetermined succession of relative movements between the contouring tool and the member to be contoured.

17. In a machine tool, a support member, a first machine member mounted on the support member for movement relative thereto and a second machine member mounted on the first machine member for movement therewith and relative thereto, each of said machine members having an electrical synchro output element operatively connected thereto for rotation as said members move relative to the member on which they are mounted, a first pair of electrical synchro input elements electrically connectable one at a time to the synchro output element rotated by the first machine member and a second pair of electrical synchro input elements electrically connectable one at a time to the synchro output element rotated by the second machine member, one synchro input element of each pair having a rotor angularly set to produce a null voltage output when connected to the synchro output element to which it is connectable when the machine member which rotates said synchro output element is in a first selected position relative to the member on which it is mounted and to produce a voltage of predetermined polarity when said machine member is spaced in a predetermined direction from said first selected position, the other synchro input element of each pair having a rotor angularly set to produce a null voltage output when connected to the synchro output element to which it is connectable when the machine member which rotates said synchro output element is in a second selected position relative to the member on which it is mounted spaced in said predetermined direction from said first selected position and to produce a voltage of opposite polarity when said machine member is spaced from said second selected position toward said first selected position, a motor connected to each machine member for movement thereof, an electrically operated control member connected to each motor for operation thereof and electrically connected to the synchro output element of the machine member connected to the motor, said control member effective to run the motor in one direction for movement of the machine member in said predetermined direction in response to voltage of said opposite polarity and to run the motor in the opposite direction for movement of the machine member opposite to said predetermined direction in response to voltage of said predetermined polarity, and means to effect coordinated connection of selected synchro input elements of each pair to the synchro output elements to which they are connectable.

18. In a grinding machine having a grinding wheel, a mechanism for forming a contour defining in cross section a circular arc of predetermined radius on the periphery of said wheel, the mechanism comprising a support, means defining straight ways on the support, a lower slide received on the ways of the support and movable during forming along a straight path thereon, means defining straight ways on the lower slide transverse to the ways on the support, an upper slide received on the ways of the lower slide and movable during forming along a straight path thereon, said slides having free relative motion therebetween and said ways restricting movement of the upper slide to movement in translation, a forming tool mounted on the upper slide, a member pivotally connected to the support member on an axis and pivotally connected to the upper slide at a distance from said axis in a plane parallel to the plane of movement of the upper slide equal to said predetermined radius of the wheel to define a singe radius arm between the support and the upper slide, and means to effect relative shifting between the support member and the grinding wheel.

References Cited in the file of this patent
UNITED STATES PATENTS

| | | |
|---|---|---|
| 2,298,496 | Metzger | Oct. 13, 1942 |
| 2,380,693 | Hahir | July 31, 1945 |
| 2,402,070 | Mudica | June 11, 1946 |
| 2,666,169 | Jarvis | Jan. 12, 1954 |
| 2,716,913 | Leerkamp | Sept. 6, 1955 |
| 2,772,670 | Jones | Dec. 4, 1956 |
| 2,783,422 | Fouassin | Feb. 26, 1957 |
| 2,798,992 | Adler et al. | July 9, 1957 |

FOREIGN PATENTS

| | | |
|---|---|---|
| 117,201 | Australia | June 29, 1943 |